US012464090B2

(12) United States Patent
El Essaili et al.

(10) Patent No.: US 12,464,090 B2
(45) Date of Patent: Nov. 4, 2025

(54) METHODS PROVIDING VIDEO CONFERENCING WITH ADJUSTED/MODIFIED VIDEO AND RELATED VIDEO CONFERENCING NODES

(71) Applicant: Telefonaktiebolaget LM Ericsson (publ), Stockholm (SE)

(72) Inventors: Ali El Essaili, Aachen (DE); Joerg Christian Ewert, Aachen (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/909,086

(22) PCT Filed: Mar. 3, 2021

(86) PCT No.: PCT/EP2021/055333
§ 371 (c)(1),
(2) Date: Sep. 2, 2022

(87) PCT Pub. No.: WO2021/175920
PCT Pub. Date: Sep. 10, 2021

(65) Prior Publication Data
US 2023/0101902 A1 Mar. 30, 2023

Related U.S. Application Data

(60) Provisional application No. 62/986,394, filed on Mar. 6, 2020.

(51) Int. Cl.
*H04N 7/15* (2006.01)
*G02B 27/00* (2006.01)
(Continued)

(52) U.S. Cl.
CPC ......... *H04N 7/157* (2013.01); *G02B 27/0093* (2013.01); *G02B 27/0101* (2013.01);
(Continued)

(58) Field of Classification Search
CPC ................ H04N 7/157; G02B 27/0093; G02B 27/0101; G02B 27/017; G02B 27/0179;
(Continued)

(56) References Cited

U.S. PATENT DOCUMENTS

| 8,896,655 B2 * | 11/2014 | Mauchly | ................ | H04N 23/90 348/14.06 |
| 9,524,588 B2 | 12/2016 | Barzuza et al. | | |

(Continued)

FOREIGN PATENT DOCUMENTS

| CN | 108076307 A | 5/2018 |
| EP | 3358835 A1 | 8/2018 |

(Continued)

OTHER PUBLICATIONS

International Search Report and Written Opinion of the International Searching Authority for PCT International Application No. PCT/EP2021/055333 dated Jul. 9, 2021.
(Continued)

*Primary Examiner* — James T Tsai
(74) *Attorney, Agent, or Firm* — Sage Patent Group

(57) ABSTRACT

Video conferencing can be provided between a first participant using first augmented reality, AR, glasses with a first forward facing glasses camera and using a first conferencing camera and a second participant using second AR glasses with a second forward facing glasses camera and using a second conferencing camera. A video of the second participant can be received from the second conferencing camera. A video can be received from the first forward facing glasses camera of the first AR glasses. The video of the second participant can be adjusted based on the video from the first forward facing glasses camera to provide adjusted video. The adjusted video can be provided to be rendered by the first AR glasses for the first participant.

17 Claims, 18 Drawing Sheets

(51) Int. Cl.
    *G02B 27/01* (2006.01)
    *G06F 3/01* (2006.01)
    *G06T 15/20* (2011.01)
    *G06T 19/00* (2011.01)
    *G06T 19/20* (2011.01)
    *H04W 4/80* (2018.01)

(52) U.S. Cl.
    CPC ....... *G02B 27/017* (2013.01); *G02B 27/0179* (2013.01); *G06F 3/012* (2013.01); *G06F 3/013* (2013.01); *G06T 15/205* (2013.01); *G06T 19/006* (2013.01); *G06T 19/20* (2013.01); *H04W 4/80* (2018.02); *G02B 2027/0138* (2013.01); *G02B 2027/014* (2013.01); *G02B 2027/0178* (2013.01); *G02B 2027/0187* (2013.01); *G06T 2215/16* (2013.01); *G06T 2219/2016* (2013.01)

(58) Field of Classification Search
    CPC ...... G02B 2027/0138; G02B 2027/014; G02B 2027/0178; G02B 2027/0187; G06F 3/012; G06F 3/013; G06T 15/205; G06T 19/006; G06T 19/20; G06T 2215/16; G06T 2219/2016; H04W 4/80
    See application file for complete search history.

(56) References Cited

U.S. PATENT DOCUMENTS

| | | | |
|---|---|---|---|
| 9,712,751 B2 | 7/2017 | Williams et al. | |
| 9,743,040 B1* | 8/2017 | Newstadt | H04N 7/15 |
| 10,262,631 B1* | 4/2019 | St-Pierre | G06F 3/147 |
| 11,164,378 B1* | 11/2021 | Cowen | G01S 13/88 |
| 2014/0098210 A1* | 4/2014 | Larter | H04N 23/90 348/77 |
| 2014/0168056 A1* | 6/2014 | Swaminathan | G06V 30/142 345/156 |
| 2015/0092066 A1* | 4/2015 | Geiss | H04N 13/296 348/180 |
| 2015/0215581 A1* | 7/2015 | Barzuza | H04L 65/4038 348/14.1 |
| 2016/0240009 A1* | 8/2016 | Lyren | G02B 27/0176 |
| 2016/0323540 A1* | 11/2016 | Nilsson | G06V 20/46 |
| 2017/0256040 A1* | 9/2017 | Grauer | H04N 23/631 |
| 2018/0070026 A1* | 3/2018 | Nussbaum | G06F 3/0304 |
| 2018/0101989 A1 | 4/2018 | Frueh et al. | |
| 2018/0158246 A1 | 6/2018 | Grau et al. | |
| 2019/0253667 A1* | 8/2019 | Valli | H04N 13/243 |
| 2019/0318709 A1* | 10/2019 | Wicks | G09G 5/373 |
| 2020/0151962 A1* | 5/2020 | Holmes | G06F 3/04815 |
| 2020/0175275 A1* | 6/2020 | Oser | G06F 3/011 |

FOREIGN PATENT DOCUMENTS

| | | |
|---|---|---|
| JP | 2016-086321 A | 5/2016 |
| JP | 2020-507221 A | 3/2020 |
| WO | 2017027338 A1 | 2/2017 |
| WO | 2018005235 A1 | 1/2018 |

OTHER PUBLICATIONS

Yajie Zhao et al., "Mask-off: Synthesizing Face Images in the Presence of Head-mounted Displays," Oct. 2016, pp. 1-12.
Japanese Office Action, Japanese Patent Application No. 2022-552412, mailed Jan. 30, 2024, 3 pages.

* cited by examiner

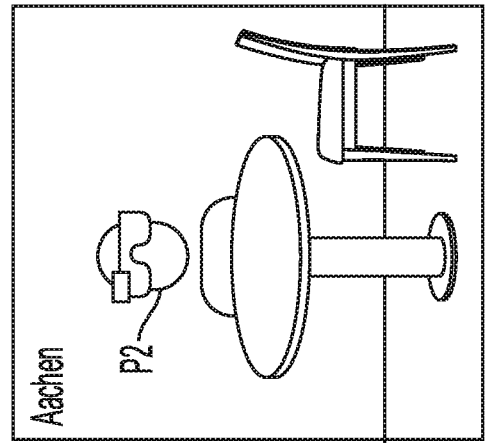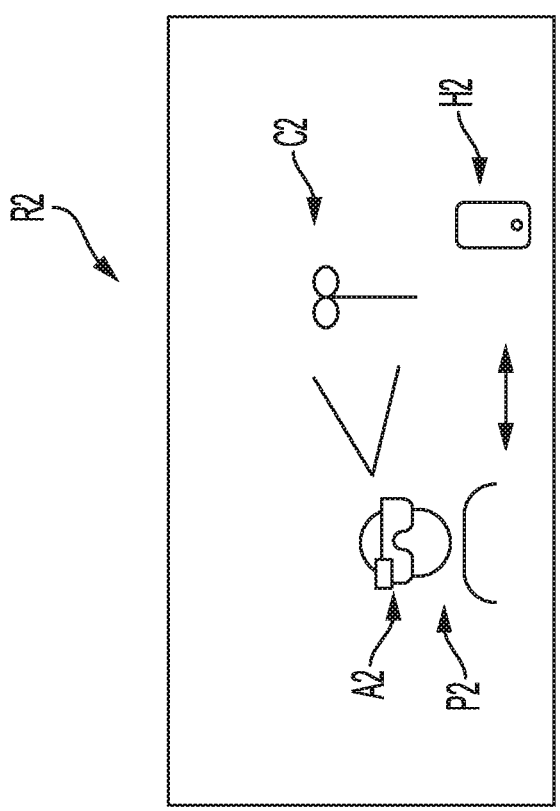
FIG. 3B
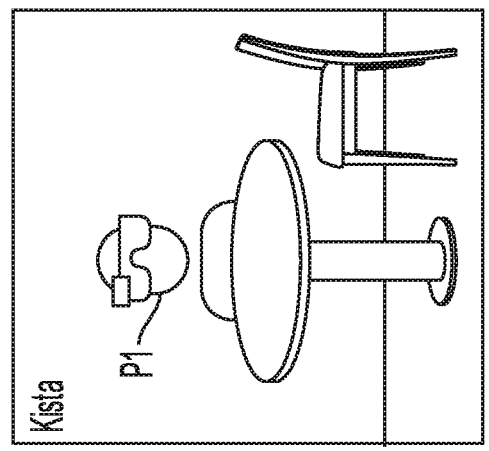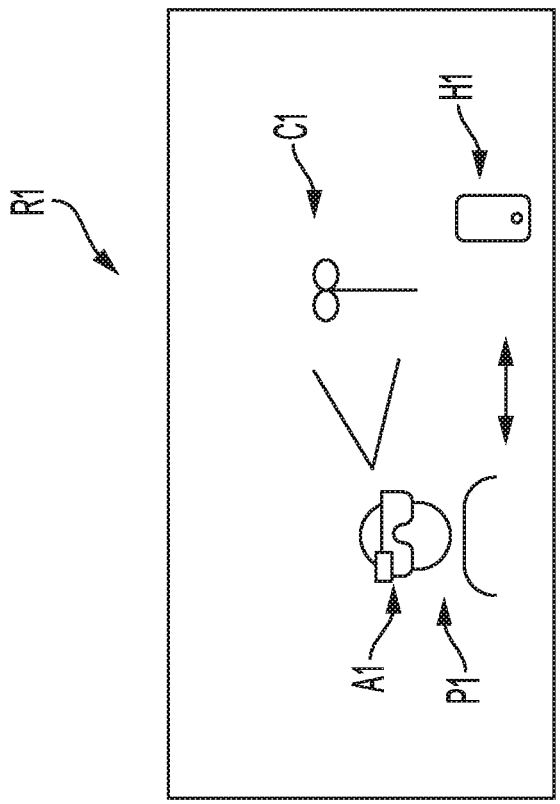
FIG. 3A

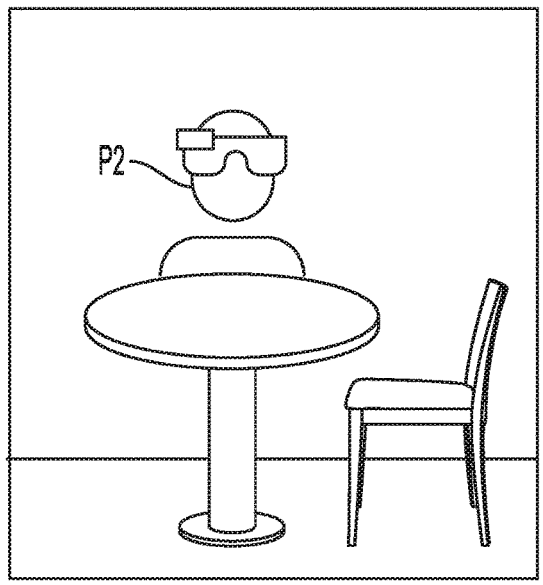
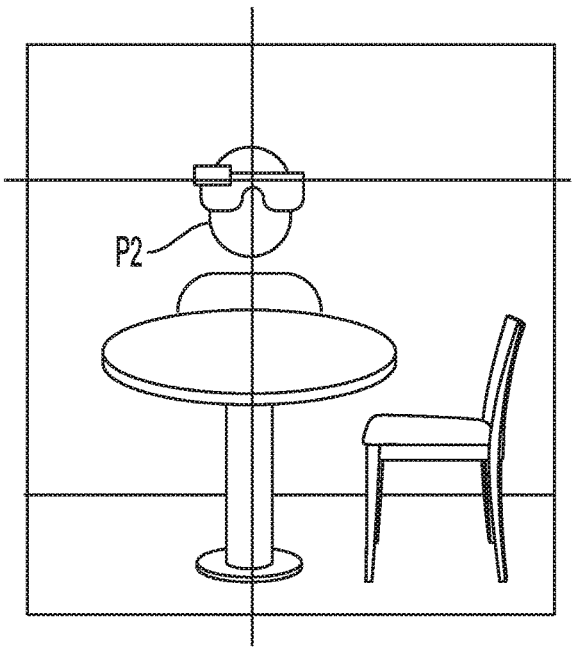
FIG. 6A  FIG. 6B
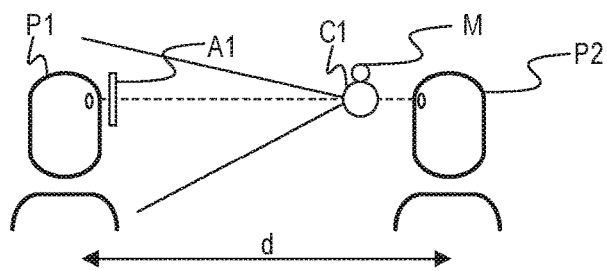
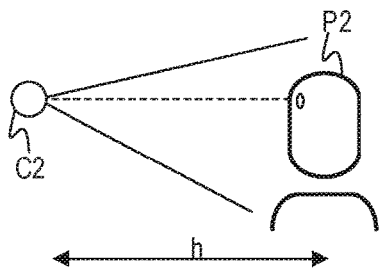
FIG. 7A  FIG. 7B
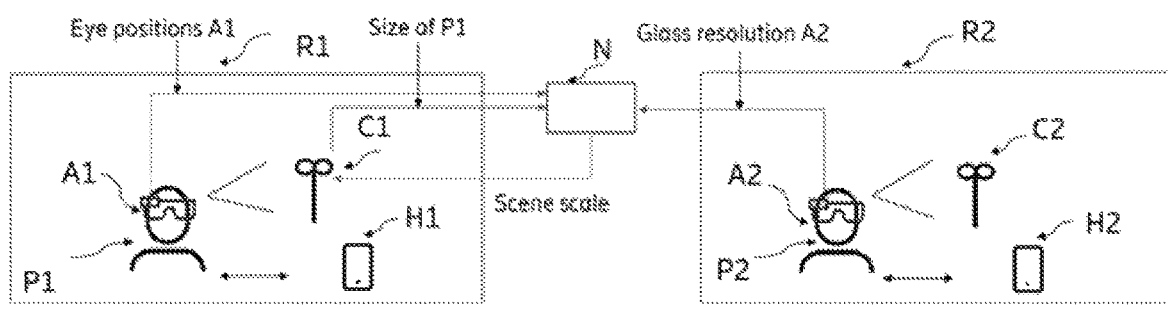
FIG. 8

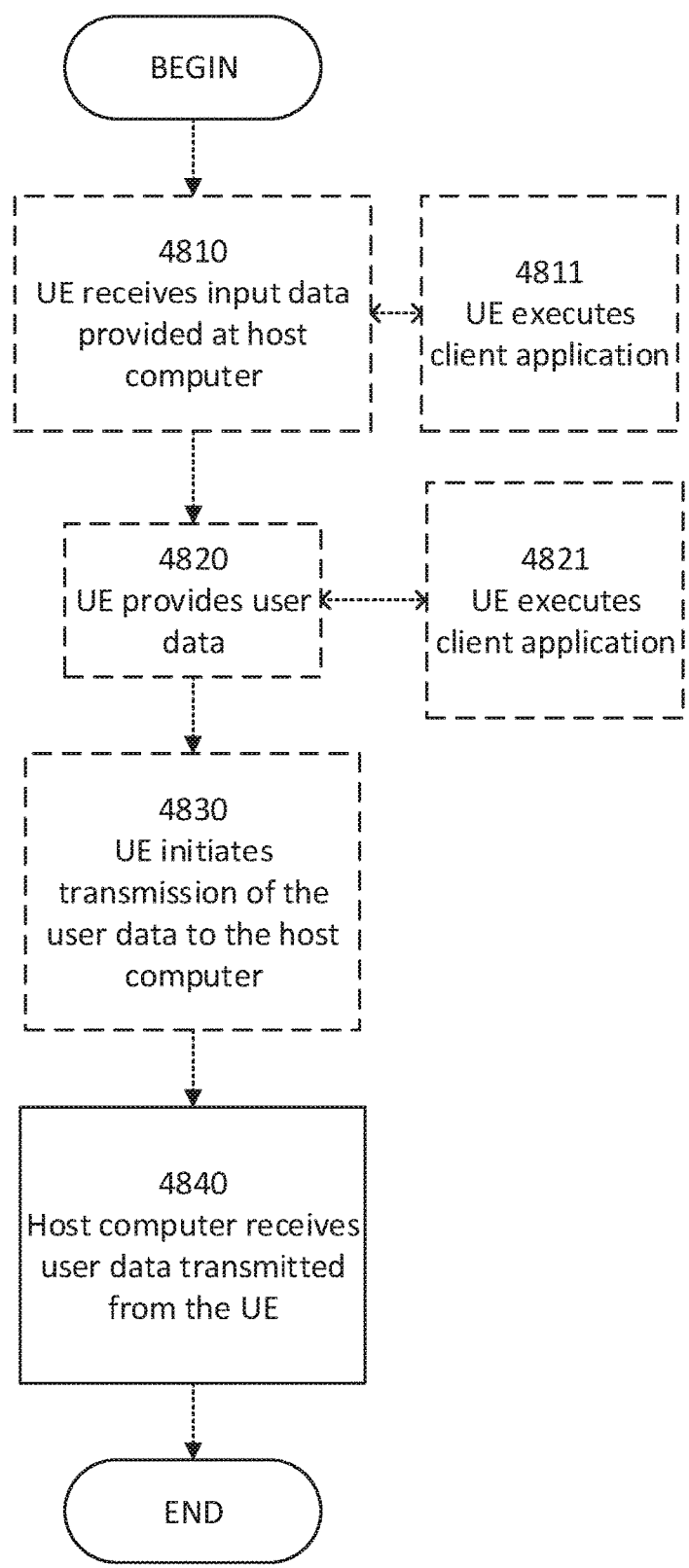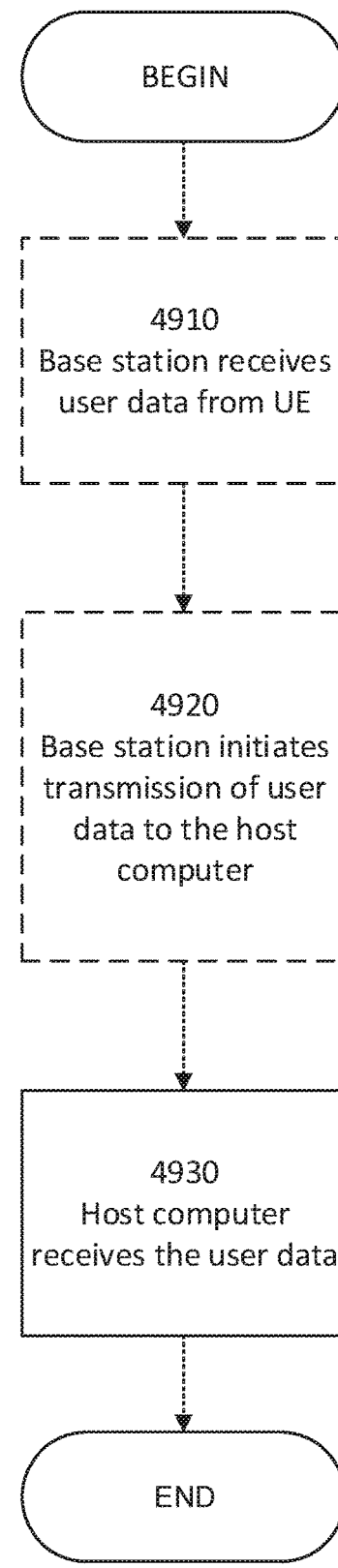
FIG. 27
FIG. 28

METHODS PROVIDING VIDEO CONFERENCING WITH ADJUSTED/MODIFIED VIDEO AND RELATED VIDEO CONFERENCING NODES

CROSS REFERENCE TO RELATED APPLICATIONS

This application is a 35 U.S.C. § 371 national stage application of PCT International Application No. PCT/EP2021/055333 filed on Mar. 3, 2021, which claims the benefit of U.S. Provisional Patent Application Ser. No. 62/986,394, filed on Mar. 6, 2020, the disclosures and content of which are incorporated by reference herein in their entireties.

TECHNICAL FIELD

The present disclosure relates generally to conferencing, and more particularly to video conferencing methods and related devices and nodes supporting video conferencing.

BACKGROUND

Video conferencing (e.g., Skype) provides a way for individuals and businesses to communicate virtually at any time and/or place. Augmented reality (AR) conferencing allows participants to communicate in an overlaid environment on top of the real world. Compared to video conferencing, AR conferencing provides an enhanced and immersive audio-visual user experience. AR devices can be classified into mixed reality (MR) standalone headsets (e.g., Magic Leap, Microsoft HoloLens), AR glasses tethered to mobile phones (e.g., NReal), and mobile AR phones and tablets. The AR market is expected to rapidly grow in the coming years.

An overview of current AR device technologies is shown in FIG. 1. For a Hololens headset, a wired connection is provided between the headset and a local computing device CD, and the local computing device may provide a wireless (e.g., WiFi) or wired coupling with a cloud based conferencing application server (e.g., via a local area network, a wide area network, and/or a cellular communication network). Moreover, the Hololens headset may provide a resolution of 1268×720 pixels at 60 frames per second (fps) with a 29 degree horizontal field of view and a 17 degree vertical field of view.

For a Magicleap headset, a wired connection is provided between the headset and a local computing device CD, and the local computing device may provide a wireless (e.g., WiFi) or wired coupling with a cloud based conferencing application server (e.g., via a local area network, a wide area network, and/or a cellular communication network). Moreover, the Magicleap headset may provide a resolution of 1280×960 pixels at 60 frames per second (fps) with a 40 degree horizontal field of view and a 30 degree vertical field of view.

For Vuzix glasses, a wireless (e.g., WiFi) and/or wired coupling may be provided between the smart glasses and a cloud based conferencing application server (e.g., via a local area network, a wide area network, and/or a cellular communication network). Moreover, the Vuzix glasses may provide a resolution of 480×853 pixels with a 19 degree horizontal field of view and a 28 degree vertical field of view.

For NReal glasses, a wired connection is provided between the glasses and a mobile smartphone SP, and the mobile smartphone SP may provide a wireless (e.g., 5G) or wired coupling with a cloud based conferencing application server (e.g., via a local area network, a wide area network, and/or a cellular communication network). Moreover, the NReal glasses may provide a resolution of 1920×1080 with a 50 degree horizontal field of view and a 30 degree vertical field of view.

In general, each lens in a pair of AR glasses may provide a display configured to render video for each eye. When used for video conferencing, a wired and/or wireless coupling may be provided between the AR glasses and a video conferencing application server. Accordingly, video from a remote participant in a video conference may be received at the AR glasses via the video conference application server and rendered on the lenses of the AR glasses. In general, the video from a remote participant in a video conference may be received and rendered on the AR glasses, or received and rendered on a network node or mobile phone tethered to the AR glasses.

XR (Extended reality) is broadly used for AR, MR, and VR (Virtual Reality). XR conferencing has been considered in Chinese Application CN108076307A (also referred to as Reference [1]) where depth information of each participant is used to extract a human body contour outline figure and actual participant scene location. In U.S. Pat. No. 9,524,588 (also referred to as Reference [2]) the received video from a remote participant is used to determine the position of remote participant and determine the view of Head Mounted Display (HMD). In U.S. Pat. No. 9,712,751 (also referred to as Reference [3]) image scaling is performed based on field of view considering a single mobile device and not including XR conferencing scenarios with multiple participants.

In remote conferencing applications, however, it may be difficult to provide the perception of an in person meeting.

SUMMARY

According to some embodiments of inventive concepts, a method provides video conferencing between a first participant (P1) using first augmented reality AR glasses with a first forward facing glasses camera and using a first conferencing camera and a second participant using second AR glasses with a second forward facing glasses camera and using a second conferencing camera. Video of the second participant is received from the second conferencing camera. Video is received from the first forward facing glasses camera of the first AR glasses. The video of the second participant is adjusted based on the video from the first forward facing glasses camera to provide adjusted video. The adjusted video is provided to be rendered by the first AR glasses for the first participant.

According to some embodiments of inventive concepts, a method provides video conferencing between a first participant using first augmented reality AR glasses with a first forward facing glasses camera and using a first conferencing camera and a second participant using second AR glasses with a second forward facing glasses camera and using a second conferencing camera. Video of the second participant is received from the second conferencing camera. The video of the second participant is adjusted by scaling the video of the second participant to provide a target perceived distance between the first participant and the second participant to provide adjusted video. The adjusted video is provided to be rendered by the first AR glasses for the first participant.

According to some embodiments of inventive concepts, a method provides video conferencing between a first participant using first augmented reality AR glasses and using a first conferencing camera and a second participant using second AR glasses and using a second conferencing camera. Images of the first participant are provided without the first AR glasses in memory, wherein the images of the first participant are provided with different orientations of the head of the first participant without the first AR glasses. Preliminary conferencing video of the first participant wearing the first AR glasses is received from the first conferencing camera. The preliminary conferencing video of the first participant is modified based on the images of the first participant to provide modified conferencing video of the first participant without the first AR glasses. The modified conferencing video of the first participant without the first AR glasses is provided to be rendered by the second AR glasses for the second participant.

According to some embodiments of inventive concepts, a perception of eye contact and/or appropriate social distance may be provided for video conferencing.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 3A-B are diagrams illustrating models for AR conferencing according to some embodiments of inventive concepts;

FIGS. 6A-B are photographs illustrating detection of eye position according to some embodiments of inventive concepts;

FIGS. 7A-B are diagrams illustrating video adjustment for AR glasses used in video conferencing according to some embodiments of inventive concepts;

FIG. 8 is a diagram illustrating an AR video conferencing system according to some embodiments of inventive concepts;

FIG. 27 is a block diagram of methods implemented in a communication system including a host computer, a base station and a user equipment in accordance with some embodiments; and FIG. 28 is a block diagram of methods implemented in a communication system including a host computer, a base station and a user equipment in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 10:
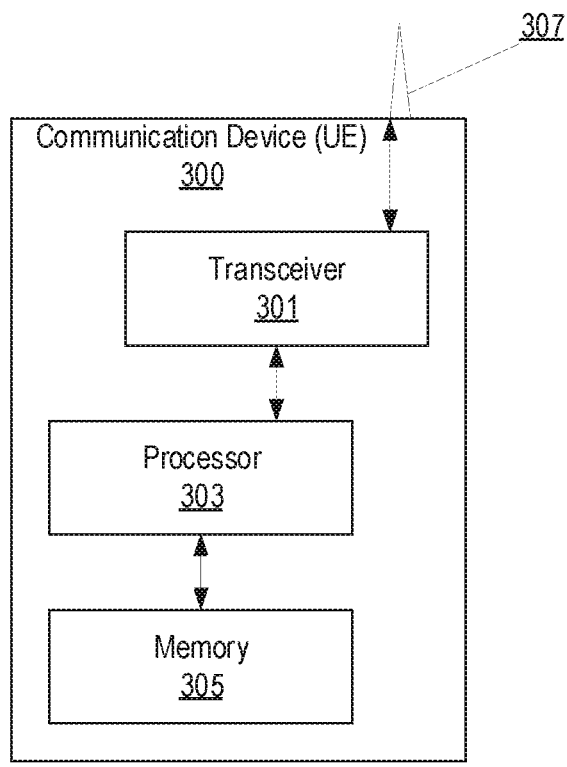
FIG. 10 is a block diagram illustrating a wireless device UE according to some embodiments of inventive concepts.

FIG. 10 is a block diagram illustrating elements of a communication device UE 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 300 may be provided, for example, as discussed below with respect to wireless device 4110 of FIG. 15.) As shown, communication device UE may include an antenna 307 (e.g., corresponding to antenna 4111 of FIG. 15), and transceiver circuitry 301 (also referred to as a transceiver, e.g., corresponding to interface 4114 of FIG. 15) including a transmitter and a receiver configured to provide uplink and downlink radio communications with a base station(s) (e.g., corresponding to network node 4160 of FIG. 15, also referred to as a RAN node) of a radio access network. Communication device UE may also include processing circuitry 303 (also referred to as a processor, e.g., corresponding to processing circuitry 4120 of FIG. 15) coupled to the transceiver circuitry, and memory circuitry 305 (also referred to as memory, e.g., corresponding to device readable medium 4130 of FIG. 15) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to wireless communication devices).

Figure 11:
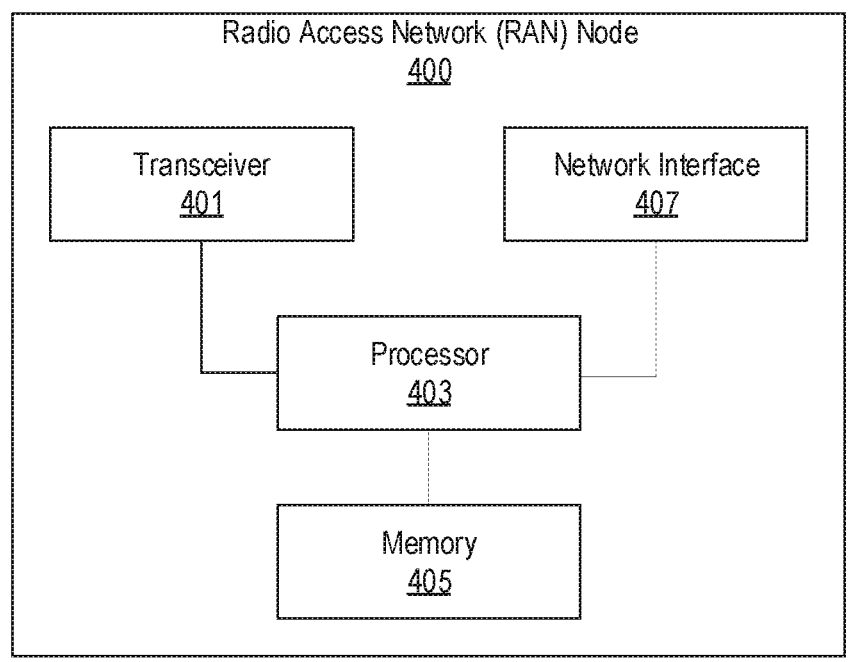
FIG. 11 is a block diagram illustrating a radio access network RAN node (e.g., a base station eNB/gNB) according to some embodiments of inventive concepts.

FIG. 11 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 4160 of FIG. 15.) As shown, the RAN node may include transceiver circuitry 401 (also referred to as a transceiver, e.g., corresponding to portions of interface 4190 of FIG. 15) including a transmitter and a receiver configured to provide uplink and downlink radio communications with mobile terminals. The RAN node may include network interface circuitry 407 (also referred to as a network interface, e.g., corresponding to portions of interface 4190 of FIG. 15) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 15) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to RAN nodes).

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 12:
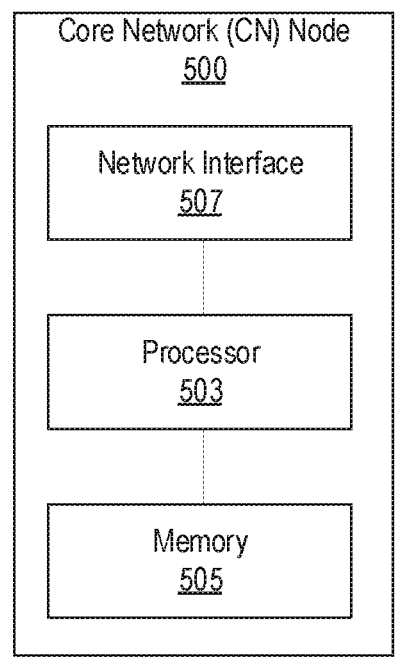
FIG. 12 is a block diagram illustrating a core network CN node (e.g., an AMF node, an SMF node, etc.) according to some embodiments of inventive concepts.

FIG. 12 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to core network nodes).

Figure 13:
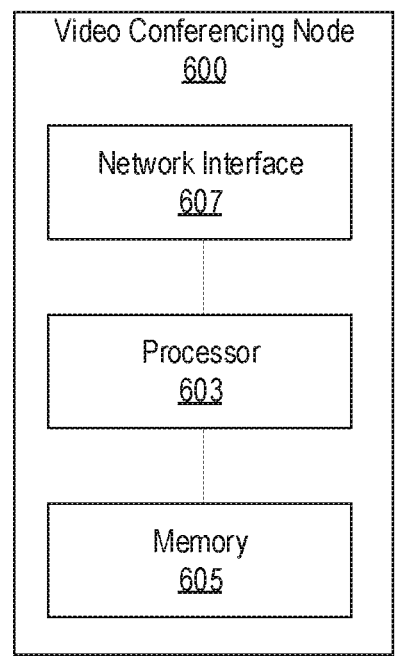
FIG. 13 is a block diagram illustrating a video conferencing node according to some embodiments of inventive concepts.

FIG. 13 is a block diagram illustrating elements of a video conferencing node configured to provide video conferencing according to embodiments of inventive concepts. As shown, the video conferencing node may include network interface circuitry 607 (also referred to as a network interface) configured to provide communications, for example, with nodes of a core network and/or a radio access network RAN of a wireless mobile/cellular communication system/network (e.g., a 3rd Generation Partnership Project 3GPP communication system/network. The video conferencing node may also include a processing circuitry 603 (also referred to as a processor) coupled to the network interface circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the video conferencing node may be performed by processing circuitry 603 and/or network interface circuitry 607. For example, processing circuitry 603 may control network interface circuitry 607 to transmit communications through network interface circuitry 607 to one or more other network nodes and/or to receive communications through network interface circuitry from one or more other network nodes. Moreover, modules may be stored in memory 605, and these modules may provide instructions so that when instructions of a module are executed by processing circuitry 603, processing circuitry 603 performs respective operations (e.g., operations discussed below with respect to Example Embodiments relating to video conferencing nodes).

According to some embodiments of inventive concepts, video conferencing node 600 may be provided as a node inside a wireless mobile/cellular communication network/system. According to some other embodiments of inventive concepts, video conferencing node 600 may be provided as a video conferencing application server outside a wireless mobile/cellular communication network/system and providing video conferencing service over the wireless mobile/cellular communication network/system. According to some embodiments, video conferencing node 600 may be referred to as a video conferencing network component entity and/or a video conferencing network component function.

Figure 1:
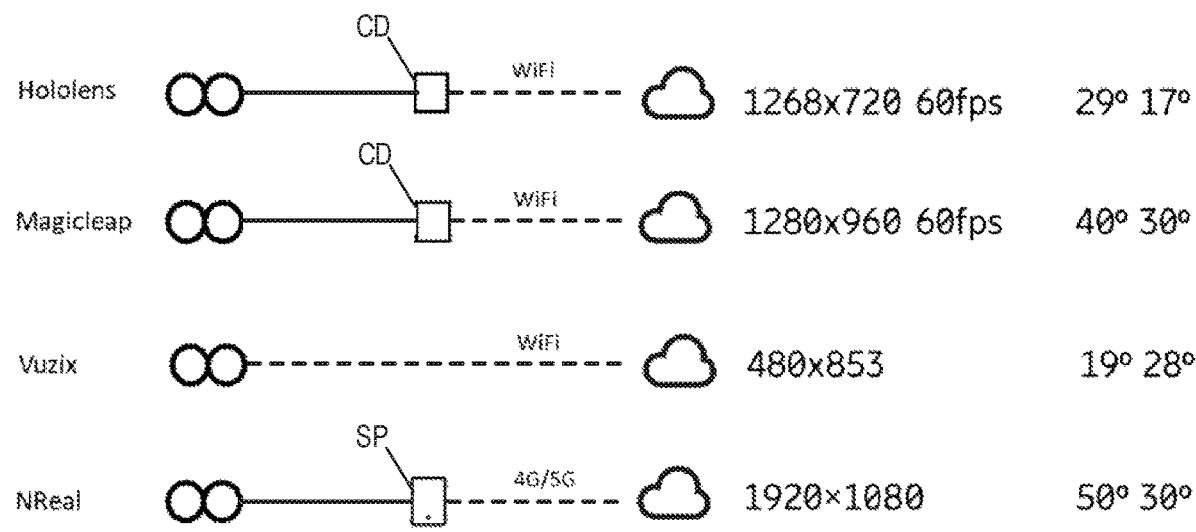
FIG. 1 provides an overview of AR devices.
Figure 2A:
FIGS. 2A-B are photographs illustrating eye contact in a normal conversion and lack of eye contact in a video conference.
Figure 2B:

In audio/video conferencing today (e.g., Skype), direct eye contact is often ignored as shown in FIGS. 2A-B. FIG. 2A is a photograph illustrating direct eye contact during an in-person conversation. FIG. 2B is a photograph illustrating a typical view of a participant in a video conference where the appearance of eye contact is lost because the camera is not centered on the screen that the participant is viewing. When using a laptop computer to conduct a video conference, for example, the participant is looking at the screen to see the other participant(s) in the video conference and the camera is positioned above the screen. Accordingly, the camera captures an image of the participant looking down (relative to the camera). As a result, each participant sees an image of the other participant where the other participant appears to be looking down so that the perception of eye contact is lost.

In an AR conferencing scenario, a video of a first person captured by a first camera is transmitted and rendered on the AR glasses of the second person. The video of the second person captured by a second camera is also transmitted and rendered on the AR glasses of the first person.

There may be several problems, some of which are discussed below.

In an AR conferencing scenario, the captured scene may not match the rendered scene on the glasses so that a perception of eye contact and appropriate social distance (1-1.2 m) may be difficult to achieve.

In an AR conference scenario, different cameras may have different resolutions, and different glasses may have different resolutions. The size of other person rendered by the glasses may thus be much smaller making the perception of eye contact and/or social contact/distance difficult/impossible to achieve.

In an AR conference scenario, when a person moves his eyes or head, the scene may need to be adjusted to maintain the perception of eye contact and/or social distance.

According to some embodiments of inventive concepts, systems and methods are provided that allows two or more participants to experience an AR conferencing session (e.g., video, audio) while maintaining a perception of eye contact and social distance. According to some embodiments, a network entity is introduced which determines settings of each camera (e.g., camera markers and/or resolution) based on input from participant devices (e.g., including AR glass resolution and eye tracking information) to provide a perception of eye contact and/or appropriate social distance.

According to some embodiments, an improved user experience may be provided in AR conferencing scenarios. Business potential for communication services solutions in the XR conferencing space may be improved by providing an enhanced experience compared to standard video conferencing that is currently available.

FIGS. 3A-B provide schematic illustration of a system model for AR conferencing according to some embodiments of inventive concepts. While shown in a scenario with two participants in a video conference, the system can be applied for multi-user AR conferencing (i.e., 3 or more participants). In room 1 R1, a first participant P1 wearing AR glasses A1 is participating in an AR conferencing session with a second participant P2 wearing AR glasses A2 and located in a distant location in room R2. The participants P1 and P2 may use respective mobile phones H1 and H2 (e.g., mobile smartphones providing data connectivity). In FIGS. 3A-B, two persons (participants P1 and P2) from Kista and Aachen are participating in an AR conferencing session. Participant P1 from Kista can see on glasses A1 participant P2 (physically located in Aachen) and filmed by camera C2, and participant P2 from Aachen can see on glasses A2 participant P1 (physically located in Kista) and filmed using camera C1. The picture at the bottom of FIG. 3A illustrates the image of participant P1 seen by participant P2 using AR glasses AR2, and the picture at the bottom of FIG. 3B illustrates the image of participant P2 seen by participant P1 using AR glasses AR1. Mobile phone H1 may be wirelessly coupled with camera C1 and AR glasses A1, and mobile phone H2 may be wirelessly coupled with camera C2 and AR glasses A2. Mobile phone H1 may receive video information from camera C1 and related information from glasses A1 for transmission via a mobile communication network to an application server where the information is processed to generate the video to be rendered on AR glasses A2, and AR glasses A2 may receive this video via mobile phone H2. Similarly, mobile phone H2 may receive video information from camera C2 and related information from glasses A2 for transmission via a mobile communication network to an application server where the information is processed to generate the video to be rendered on AR glasses A1, and AR glasses A1 may receive this video via mobile phone H1.

Figure 4A:
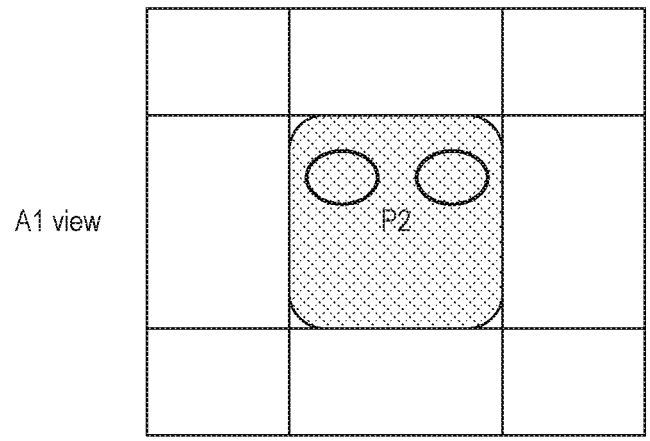
FIGS. 4A-B are diagrams illustrating scaling and eye contact in video conferencing according to some embodiments of inventive concepts.
Figure 4B:
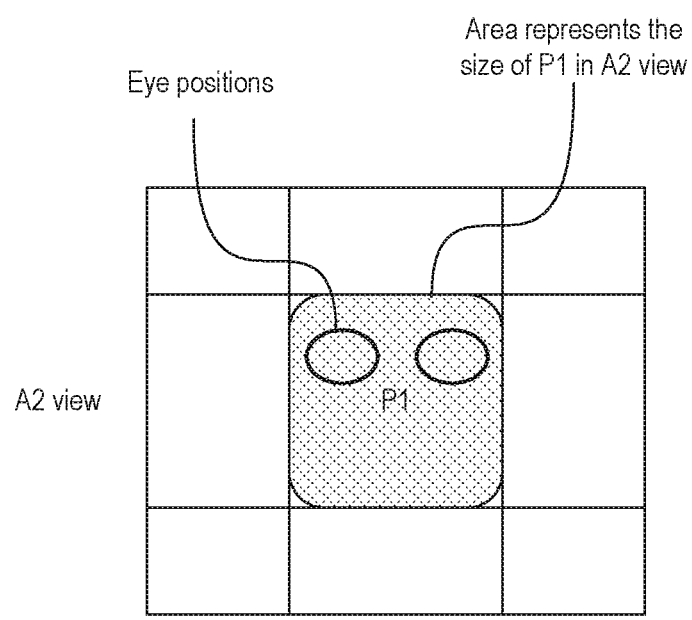

Some embodiments of inventive concepts in FIGS. 4A-B provide AR conferencing which considers eye contact and social distance. The projection of participant P1 on AR glasses A2 in FIG. 4B shall scale properly to the projection of participant P2 on AR glasses A1 in FIG. 4A enabling personal/social contact. For eye contact, the eyes of participants P1 and P2 should be respectively rendered in AR glasses A2 and A1 matched in the scene.

Eye contact in AR conferencing is discussed below with respect to FIGS. 5A-C.

Figure 5A:
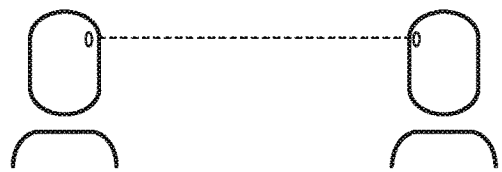
FIGS. 5A-C are diagrams illustrating eye contact and appropriate social distance in an in-person conversation, lack of eye contact in a video conference, and eye contact in a AR video conference according to some embodiments of inventive concepts.

FIG. 5A illustrates direct eye contact during an in person discussion with a 1 meter to 1.2 meter distance between participants, and a perception of such direct eye contact and distance may be desirable for AR conferencing.

Figure 5B:
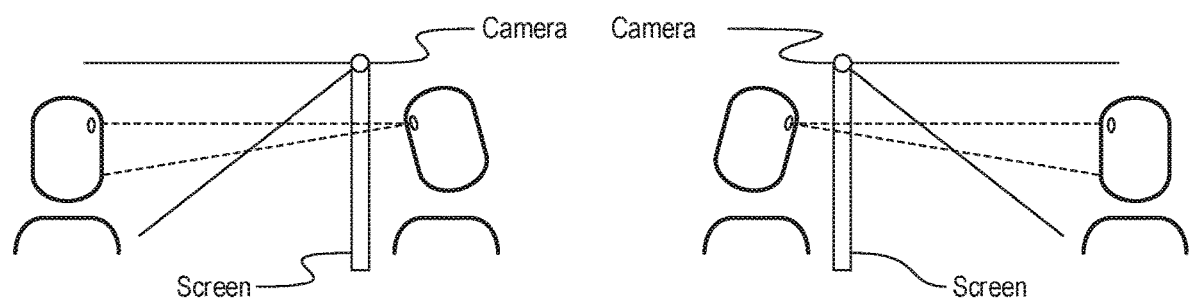

FIG. 5B illustrates an example of current one-to-one video conferencing where the camera is typically positioned on top of a screen (e.g., on a laptop or tablet computer) making the perception of eye contact difficult if not impossible to achieve. As shown, video of a first participant looking at the screen is captured by a higher camera so that the first participant is rendered on a screen of the second participant with the appearance of looking down.

Figure 5C:

FIG. 5C illustrates one-to-one AR conferencing that provides a perception of maintaining eye contact between the AR glasses of the two participants.

Approaches to provide/maintain eye contact in AR conferencing are discussed below according to some embodiments of inventive concepts.

In operation 1, the 3-dimensional (3D) depth camera C2 (e.g., a stereoscopic 3D video depth camera) captures video of participant P2 in the room R2 with some depth h (i.e., the distance from camera C2 to participant P2) as shown in FIG. 6B. In operation 2, the eye positions of participant P2 are detected from the captured video. Please note that techniques to detect eye positions are known in the art. Operation 2, for example, may be performed by network entity N shown in FIG. 8 (e.g., a video conferencing application server) after receiving the video from camera C2.

In operation 3 (illustrated in FIGS. 7A-B), the video of participant P2 is scaled using a target distance d (e.g., 1.20 m) and depth h. In FIG. 7A, d is the target distance (e.g., 1.2$m$) intended to provide a perception of appropriate social distance between the two participants P1 and P2, and in FIG. 7B, h is the distance between participant P2 and camera C2. In addition, an image/video from a camera of the AR glasses A1 may be used to determine a marker M on the camera C1. Marker M can be used by the network entity N to correctly position eyes of participant P2 of the picture in the AR glasses A1 to provide the perception of eye contact for participant P1.

FIG. 8 illustrates a system to provide AR conferencing including network entity N. To maintain proper scaling and eye contact between the participants, network function N collects parameters (e.g., AR glasses resolution for each set of AR glasses A2 and A2, eye positions, and size of persons) to determine a desired scene configuration to maintain a perception of appropriate social distance and eye contact. The desired scene configuration can be parametrized in terms of maker position and camera resolution and provided to the respective cameras. Please note that the list of parameters is not exclusive.

Figure 9:
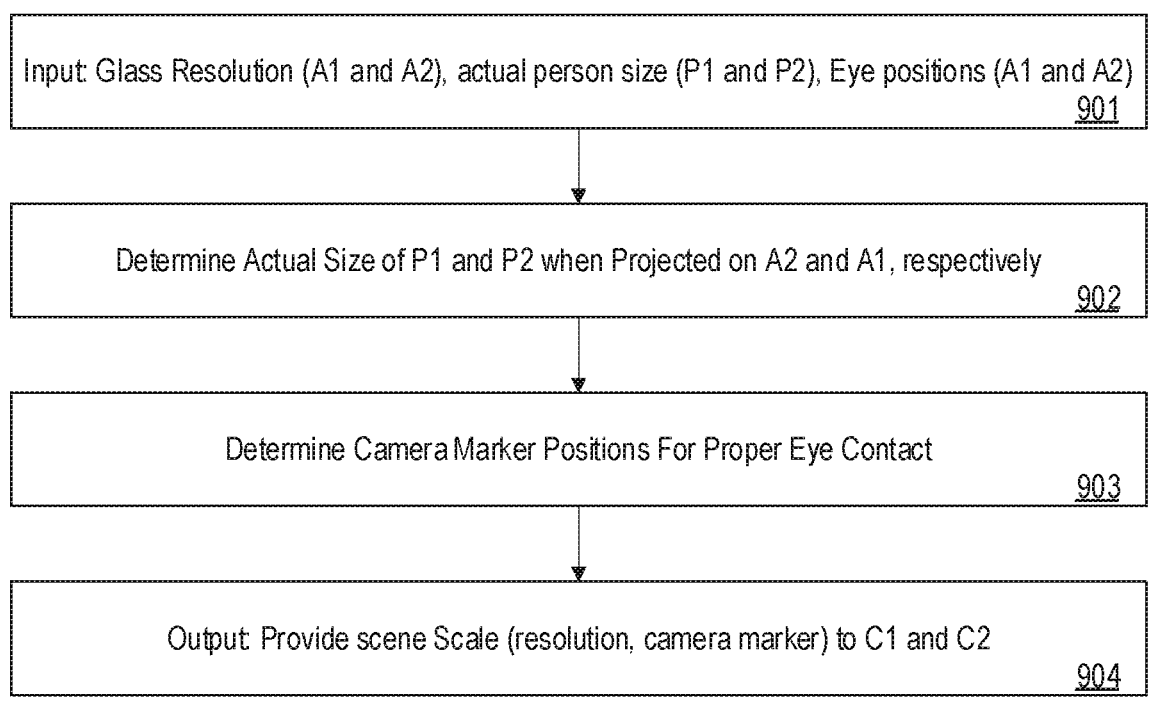
FIG. 9 is a flow chart illustrating video conferencing operations according to some embodiments of inventive concepts.

FIG. 9 illustrates a call flow for network entity N to determine a desired scene configuration. At block 901, the network entity N collects parameters from the remote participants such as AR glass resolution as well as actual person size and eye positions. The eye positions can be either determined from the camera image or provided directly from an eye tracking system in the AR glasses. The size of the person can be determined by analyzing the camera images.

At block 902, the network entity N determines the actual size of participant P1 and participant P2 when projected on glasses A2 and glasses A1, respectively. This operation provides the camera with the required resolution to maintain distance and depth when a remote participant is rendered on the AR glasses.

At block 903, the network entity N determines the target marker positions for the cameras to maintain eye contact between the participants in the scene. This operation is discussed above with respect to FIGS. 6-7.

The output configuration in terms of resolution/depth and camera marker positions is provided from the network entity N to the cameras. Eye gesture reconstruction is discussed below.

It may take at least 2-5 years until AR glasses will have the same appearance as normal glasses. The current appearance of AR glasses may lower the acceptance of AR conferencing.

One approach to address this issue is discussed below.

Operation 1: Both depth cameras C1 and C2 provide/record videos of the respective participants P1 and P2 which are not wearing glasses at that point in time. Each participant looks into the respective camera for a certain period of time (e.g., 10-20 sec) and performs slow head movements.

Operation 2: Images from the videos of participants P1 and P2 are stored and classified with relevant parameters (e.g., tilt, angle, eye movement, blinking, etc.).

Operation 3: Both participants are now wearing AR glasses

Operation 4: The video of participant P1 (wearing AR glasses A1) from camera C1 is continuously analyzed to determine angle, tilt, etc. Furthermore, the eye movement, blinking, etc. is determined using rear facing video from AR glasses A1 of participant P1.

Operation 5: These parameters (tilt, angle, eye movement, blinking, etc.) are used to reconstruct a video of participant P1 in the AR glasses A2 of participant P2. In this reconstruction process, the image of the AR glasses are removed from the picture of participant P1 using the parameters (tilt, angle, eye movement, blinking, etc.) using the former stored video, for example, using neural networks.

According to some embodiments, cameras C1 and C2 are equipped with a wireless interface (e.g., a mobile communication interface such as 4G, 5G, etc.), and/or AR glasses A1 and A2 are equipped with a wireless interface (e.g., a mobile communication interface such as 4G, 5G, etc.). In some examples, AR glasses A1 and/or A2 are equipped with a 5G interface that allows them to be connected via long range communication to a base station and/or to be connected via short range communication to another wireless device (e.g., a mobile phone).

According to some embodiments, network entity N resides inside the cellular network or at an application server or a backend system (e.g., in the cloud).

According to some embodiments, the network function N interacts with a 3GPP network system (e.g., 5G) to configure Quality of Service QoS settings and/or radio resources for the AR conferencing session.

According to some embodiments, AR conferencing uses a 3GPP system (e.g., IP Multimedia System IMS) or an over-the-top system (e.g., based on WebRTC techniques).

According to some embodiments, parameters are provided to and from the network entity either in-band (e.g., using session protocol) or out of band.

According to some embodiments, the scene configuration can be performed at initial configuration or at scene change (e.g., head movements).

According to some embodiments, proposed methods/systems can be applied to multi-party conferencing.

Heterogeneous camera types and settings can be considered. For example, one participant might use a depth camera and another participant a mobile phone for capturing video to be used for conferencing.

According to some embodiments, systems and methods are provided for AR conferencing to maintain the perception of eye contact and appropriate social distance between participants.

Operations of a video conferencing node 600 (implemented using the structure of FIG. 13) will now be discussed with reference to the flow chart of FIG. 14 according to some embodiments of inventive concepts. For example, modules may be stored in memory 605 of FIG. 13, and these modules may provide instructions so that when the instructions of a module are executed by respective video conferencing node processing circuitry 603, processing circuitry 603 performs respective operations of the flow chart.

Figure 14:
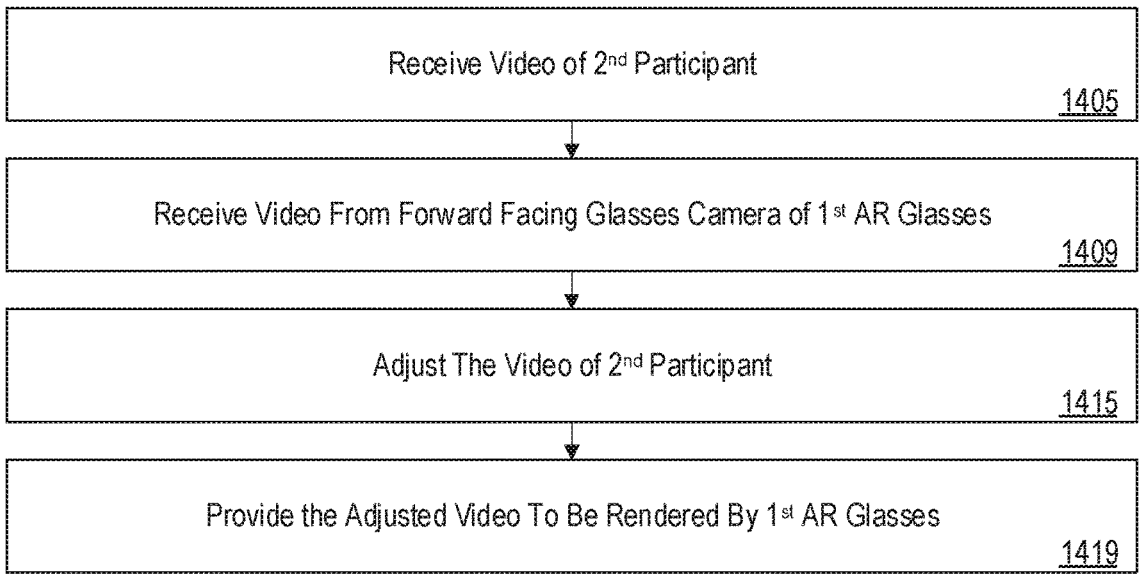
FIGS. 14-19 are flow charts illustrating operations of a video conferencing node according to some embodiments of inventive concepts.

According to operations of FIG. 14, video conferencing node 600 provides video conferencing between a first participant P1 and a second participant P2. For the video conferencing, first participant P1 uses first conferencing camera C1 and first augmented reality AR glasses A1 with a first forward facing glasses camera, and second participant P2 uses second conferencing camera C2 and second AR glasses A2 with a second forward facing glasses camera.

At block 1405, processing circuitry 603 receives (through network interface 607) video of the second participant P2 from the second conferencing camera C2.

At block 1409, processing circuitry 603 receives (through network interface 607) video from the first forward facing glasses camera of the first AR glasses A1.

At block 1415, processing circuitry 603 adjusts the video of the second participant P2 based on the video from the first forward facing glasses camera to provide adjusted video.

According to some embodiments, processing circuitry 603 may adjust the video of the second participant P2 at block 1415 by transmitting a control parameter to the second conferencing camera C2 to adjust the video provided by the second conferencing camera and thereby provide the adjusted video of the second participant P2. For example, the control parameter may include a least one of a control parameter to adjust a position of the second conferencing camera C2, a control parameter to adjust a zoom of the second conferencing camera C2, and/or a control parameter to adjust a depth of focus of the second conferencing camera C2. According to some embodiments, processing circuitry 603 may adjust the video of the second participant P2 at block 1415 by providing a transformation (e.g., a geometric transformation such as a translation or rotation) of the video of the second participant P2 received from the second conferencing camera C2 to provide the adjusted video.

According to some embodiments, processing circuitry 603 may adjust the video to provide the adjusted video by adjusting the video of the second participant P2 based on the video from the first forward facing glasses camera and by scaling the video of the second participant P2 to provide a target perceived distance (d) between the first participant P1 and the second participant P2 when rendered on the first AR glasses. Further details regarding scaling are discussed below with respect to the flow charts of FIGS. 16-17.

At block 1419, processing circuitry 603 provides (through network interface 607) the adjusted video to be rendered by the first AR glasses A1 for the first participant P1. According to some embodiments, processing circuitry 603 may provide the adjusted video by transmitting the adjusted video to the first AR glasses A1 for the first participant P1.

According to some embodiments, processing circuitry 603 may provide the adjusted video at block 1419 by providing communication of the adjusted video (through network interface 607) to the first AR glasses A1 using a wireless mobile/cellular communication system (e.g., a 3rd Generation Partnership Project, 3GPP, communication system). According to some embodiments, the video conferencing node 600 may be included as an element of the wireless mobile/cellular communication system, or the video conferencing node may be provided as a video conferencing application server operating outside of the wireless mobile/cellular communication system.

Various operations from the flow chart of FIG. 14 may be optional with respect to some embodiments of video conferencing nodes and related methods.

Operations of a video conferencing node 600 (implemented using the structure of FIG. 13) will now be discussed with reference to the flow chart of FIG. 15 according to some embodiments of inventive concepts. For example, modules may be stored in memory 605 of FIG. 13, and these modules may provide instructions so that when the instructions of a module are executed by respective video conferencing node processing circuitry 603, processing circuitry 603 performs respective operations of the flow chart.

Figure 15:
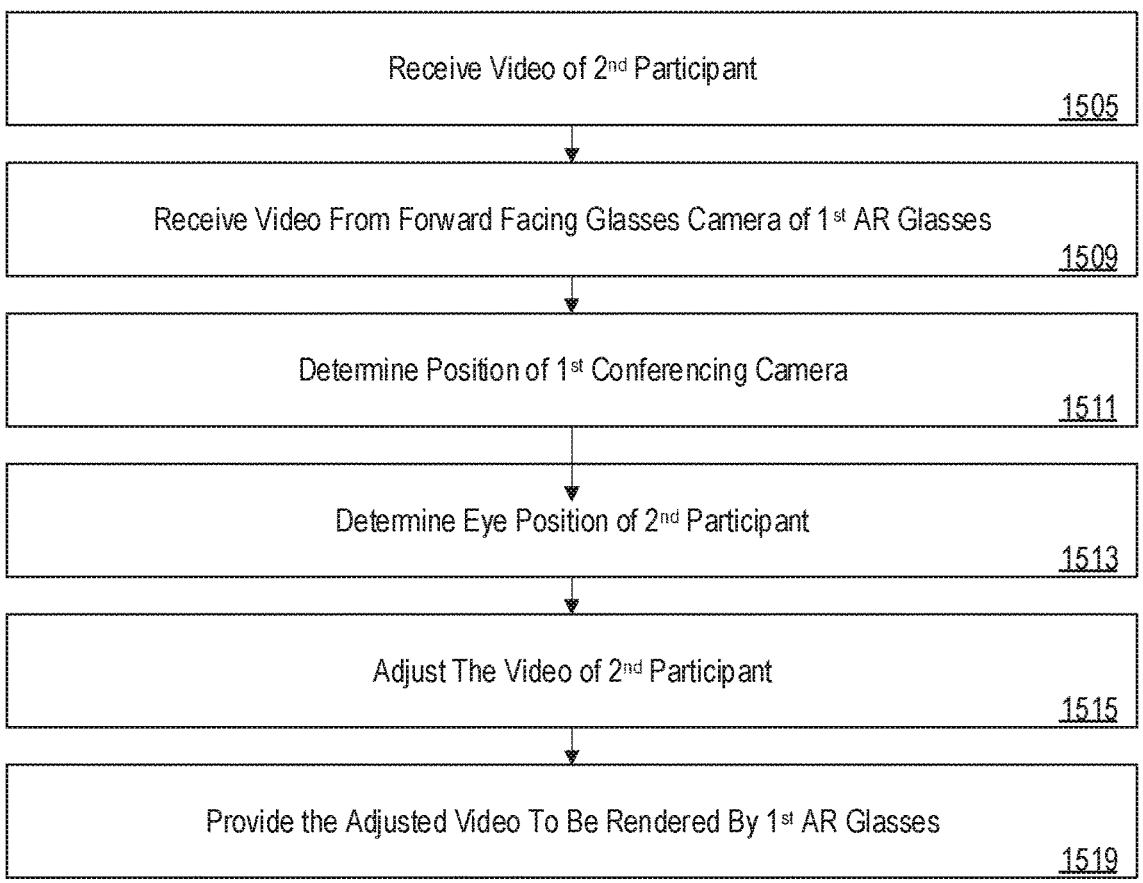

According to operations of FIG. 15, video conferencing node 600 provides video conferencing between a first participant P1 and a second participant P2. For the video conferencing, first participant P1 uses first conferencing camera C1 and first augmented reality AR glasses A1 with a first forward facing glasses camera, and second participant P2 uses second conferencing camera C2 and second AR glasses A2 with a second forward facing glasses camera.

At block 1505, processing circuitry 603 receives (through network interface 607) video of the second participant P2 from the second conferencing camera C2.

At block 1509, processing circuitry 603 receives (through network interface 607) video from the first forward facing glasses camera of the first AR glasses A1.

At block 1511, processing circuitry 603 may determine a position of the first conferencing camera C1 using the video from the first forward facing glasses camera. For example, processing circuitry 603 may determine a position of a marker (M) on the first conferencing camera C1.

At block 1513, processing circuitry 603 may determine an eye position of the second participant P2 in the video from the second camera C2.

At block 1515, processing circuitry 603 adjusts the video of the second participant P2 based on the video from the first forward facing glasses camera to provide adjusted video.

According to some embodiments, processing circuitry 603 may adjust the video of the second participant P2 at block 1515 by transmitting a control parameter to the second conferencing camera C2 to adjust the video provided by the second conferencing camera and thereby provide the adjusted video of the second participant P2. For example, the control parameter may include a least one of a control parameter to adjust a position of the second conferencing camera C2, a control parameter to adjust a zoom of the second conferencing camera C2, and/or a control parameter to adjust a depth of focus of the second conferencing camera C2. According to some embodiments, processing circuitry 603 may adjust the video of the second participant P2 at block 1515 by providing a transformation (e.g., a geometric transformation such as a translation or rotation) of the video of the second participant P2 received from the second conferencing camera C2 to provide the adjusted video.

According to some embodiments, processing circuitry 603 may adjust the video to provide the adjusted video by adjusting the video of the second participant P2 based on the video from the first forward facing glasses camera and by scaling the video of the second participant P2 to provide a target perceived distance (d) between the first participant P1 and the second participant P2 when rendered on the first AR glasses. Further details regarding scaling are discussed below with respect to the flow charts of FIGS. 16-17.

According to some embodiments, processing circuitry 603 may adjust the video of the second participant P2 to provide the adjusted video based on the position of the first conferencing camera C1 determined using the video from the first forward facing glasses camera at block 1511. For example, processing circuitry 603 may adjust the video of the second participant P2 to provide the adjusted video based on the position of the marker M.

According to some embodiments, processing circuitry 603 may adjust the video of the second participant P2 to provide the adjusted video based on the eye position of the second participant P2 determined at block 1513 and based on the video from the first forward facing glasses camera. For example, processing circuitry 603 may adjust the video of the second participant P2 to provide the adjusted video using the eye position of the second participant P2 and using the video from the first forward facing glasses camera to provide a perception of eye contact.

At block 1519, processing circuitry 603 provides (through network interface 607) the adjusted video to be rendered by the first AR glasses A1 for the first participant P1. According to some embodiments, processing circuitry 603 may provide the adjusted video by transmitting the adjusted video to the first AR glasses A1 for the first participant P1.

According to some embodiments, processing circuitry 603 may provide the adjusted video at block 1519 by providing communication of the adjusted video (through network interface 607) to the first AR glasses A1 using a wireless mobile/cellular communication system (e.g., a 3rd Generation Partnership Project, 3GPP, communication system). According to some embodiments, the video conferencing node 600 may be included as an element of the wireless mobile/cellular communication system, or the video conferencing node may be provided as a video conferencing application server operating outside of the wireless mobile/cellular communication system.

Various operations from the flow chart of FIG. 15 may be optional with respect to some embodiments of video conferencing nodes and related methods. Regarding methods of example embodiment 1 (set forth below), for example, operations of blocks 1511 and/or 1513 of FIG. 15 may be optional.

Operations of a video conferencing node 600 (implemented using the structure of FIG. 13) will now be discussed with reference to the flow chart of FIG. 16 according to some embodiments of inventive concepts. For example, modules may be stored in memory 605 of FIG. 13, and these modules may provide instructions so that when the instructions of a module are executed by respective video conferencing node processing circuitry 603, processing circuitry 603 performs respective operations of the flow chart.

Figure 16:
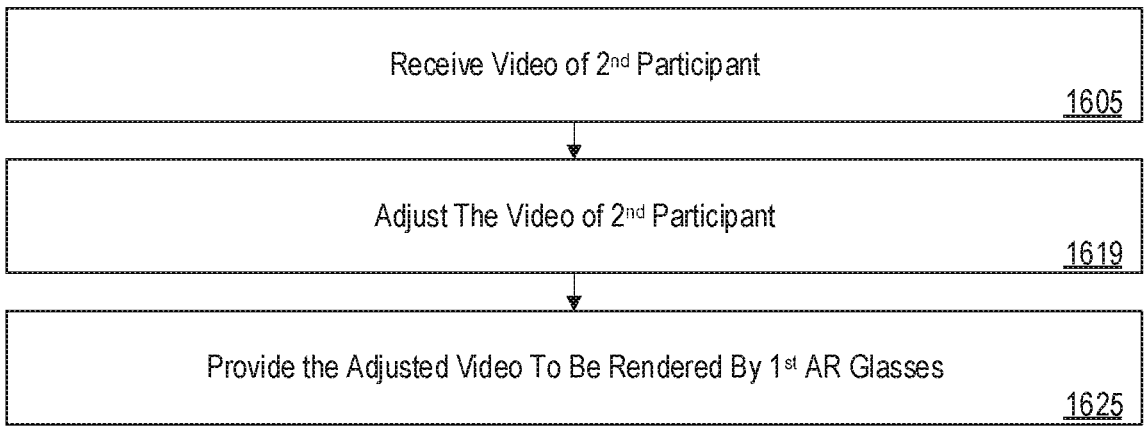

According to operations of FIG. 16, video conferencing node 600 provides video conferencing between a first participant P1 and a second participant P2. For the video conferencing, first participant P1 uses first conferencing camera C1 and first augmented reality AR glasses A1 with a first forward facing glasses camera, and second participant P2 uses second conferencing camera C2 and second AR glasses A2 with a second forward facing glasses camera.

At block 1605, processing circuitry 603 receives (through network interface 607) video of the second participant P2 from the second conferencing camera C2.

At block 1619, processing circuitry 603 adjusts the video of the second participant P2 by scaling the video of the second participant P2 to provide a target perceived distance (d) between the first participant P1 and the second participant P2 to provide adjusted video. According to some embodiments, processing circuitry 603 may scale the video of the second participant P2 to provide the target perceived distance between the first participant P1 and the second participant P2 based on at least one of a resolution of the first AR glasses A1 and/or a resolution of the second AR glasses A2.

At block 1625, processing circuitry 603 provides (through network interface 607) the adjusted video to be rendered by the first AR glasses A1 for the first participant P1.

According to some embodiments, processing circuitry 603 may provide the adjusted video at block 1625 by providing communication of the adjusted video (through network interface 607) to the first AR glasses A1 using a wireless mobile/cellular communication system (e.g., a 3rd Generation Partnership Project, 3GPP, communication system). According to some embodiments, the video conferencing node 600 may be included as an element of the wireless mobile/cellular communication system, or the video conferencing node may be provided as a video conferencing application server operating outside of the wireless mobile/cellular communication system.

Various operations from the flow chart of FIG. 16 may be optional with respect to some embodiments of video conferencing nodes and related methods.

Operations of a video conferencing node 600 (implemented using the structure of FIG. 13) will now be discussed with reference to the flow chart of FIG. 17 according to some embodiments of inventive concepts. For example, modules may be stored in memory 605 of FIG. 13, and these modules may provide instructions so that when the instructions of a module are executed by respective video conferencing node processing circuitry 603, processing circuitry 603 performs respective operations of the flow chart.

Figure 17:
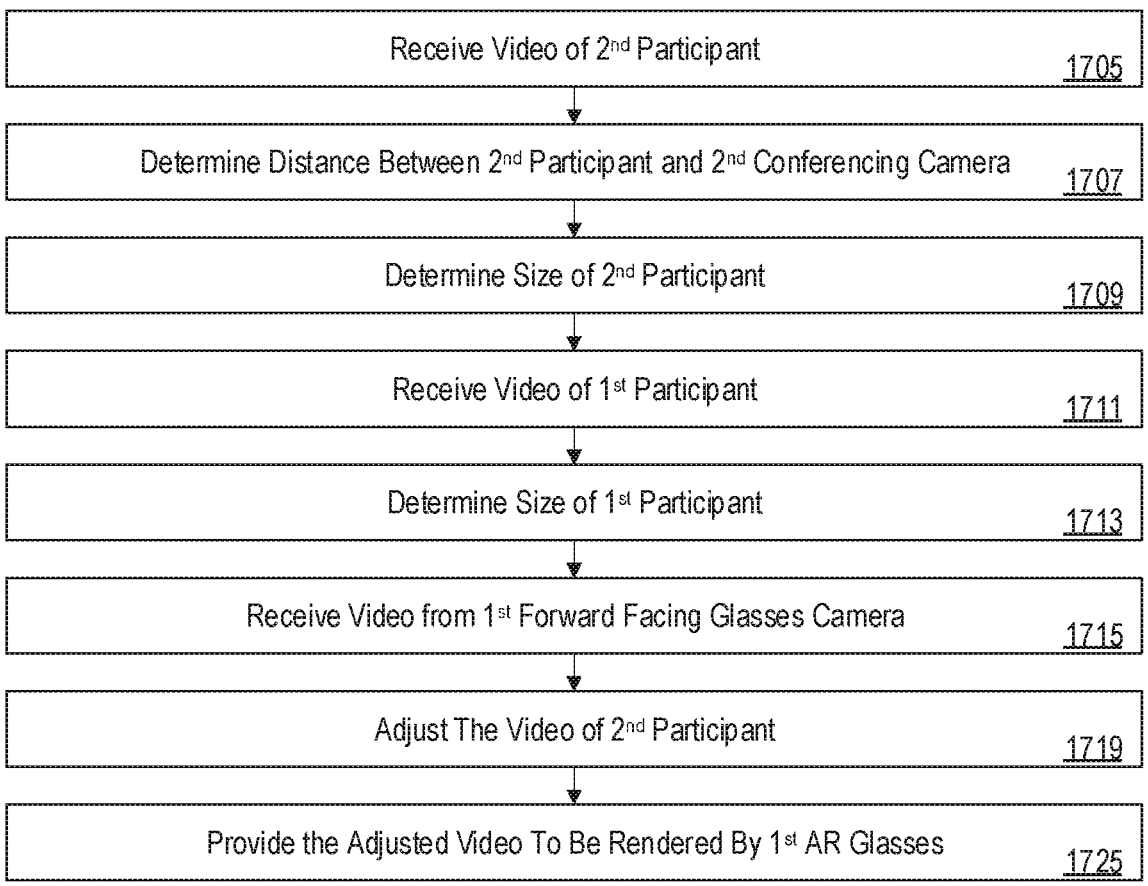

According to operations of FIG. 17, video conferencing node 600 provides video conferencing between a first participant P1 and a second participant P2. For the video conferencing, first participant P1 uses first conferencing camera C1 and first augmented reality AR glasses A1 with a first forward facing glasses camera, and second participant P2 uses second conferencing camera C2 and second AR glasses A2 with a second forward facing glasses camera.

At block 1705, processing circuitry 603 receives (through network interface 607) video of the second participant P2 from the second conferencing camera C2.

At block 1707 according to some embodiments, processing circuitry 603 may determine a distance (h) between the second participant P2 and the second conferencing camera C2.

At block 1709 according to some embodiments, processing circuitry 603 may determine a size of the second participant P2 based on the video of the second participant.

At block 1711 according to some embodiments, processing circuitry 603 may receive (through network interface 607) video of the first participant P1 from the first conferencing camera C1. At block 1713 according to some embodiments, processing circuitry 603 may determine a size of the first participant P1 based on the video of the first participant.

At block 1715 according to some embodiments, processing circuitry 603 may receive (through network interface 607) video from the first forward facing glasses camera of the first AR glasses A1.

At block 1719, processing circuitry 603 adjusts the video of the second participant P2 by scaling the video of the second participant P2 to provide a target perceived distance (d) between the first participant P1 and the second participant P2 to provide adjusted video. According to some embodiments, processing circuitry 603 may scale the video of the second participant P2 to provide the target perceived distance between the first participant P1 and the second participant P2 based on at least one of a resolution of the first AR glasses A1 and/or a resolution of the second AR glasses A2.

According to some embodiments, processing circuitry 603 may scale the video of the second participant P2 to provide the target perceived distance between the first participant P1 and the second participant P2 based on the distance (h) between the second participant P2 and the second conferencing camera C2 as determined at block 1707.

According to some embodiments, processing circuitry 603 may scale the video of the second participant P2 to provide the target perceived distance between the first participant P1 and the second participant P2 based on the size of the second participant P2 as determined at block 1709.

According to some embodiments, processing circuitry 603 may scale the video of the second participant P2 to provide the target perceived distance between the first participant P1 and the second participant P2 based on the size of the first participant P1 as determined at block 1713.

According to some embodiments, processing circuitry 603 may adjust the video of the second participant P2 based on the video from the first forward facing glasses camera to provide adjusted video and by scaling the video of the second participant P2 to provide the target perceived distance (d) between the first participant P1 and the second participant P2. Operations of adjusting the video based on video from the first forward facing glasses camera is discussed in greater detail above with respect to the flow charts of FIGS. 14-15.

At block 1725, processing circuitry 603 provides (through network interface 607) the adjusted video to be rendered by the first AR glasses A1 for the first participant P1.

According to some embodiments, processing circuitry 603 may provide the adjusted video at block 1725 by providing communication of the adjusted video (through network interface 607) to the first AR glasses A1 using a wireless mobile/cellular communication system (e.g., a 3rd Generation Partnership Project, 3GPP, communication system). According to some embodiments, the video conferencing node 600 may be included as an element of the wireless mobile/cellular communication system, or the video conferencing node may be provided as a video conferencing application server operating outside of the wireless mobile/cellular communication system.

Various operations from the flow chart of FIG. 17 may be optional with respect to some embodiments of video conferencing nodes and related methods. Regarding methods of example embodiment 15 (set forth below), for example, operations of blocks 1707, 1708, 1711, 1713, and/or 1715 of FIG. 17 may be optional.

Operations of a video conferencing node 600 (implemented using the structure of FIG. 13) will now be discussed with reference to the flow chart of FIG. 18 according to some embodiments of inventive concepts. For example, modules may be stored in memory 605 of FIG. 13, and these modules may provide instructions so that when the instructions of a module are executed by respective video conferencing node processing circuitry 603, processing circuitry 603 performs respective operations of the flow chart.

Figure 18:
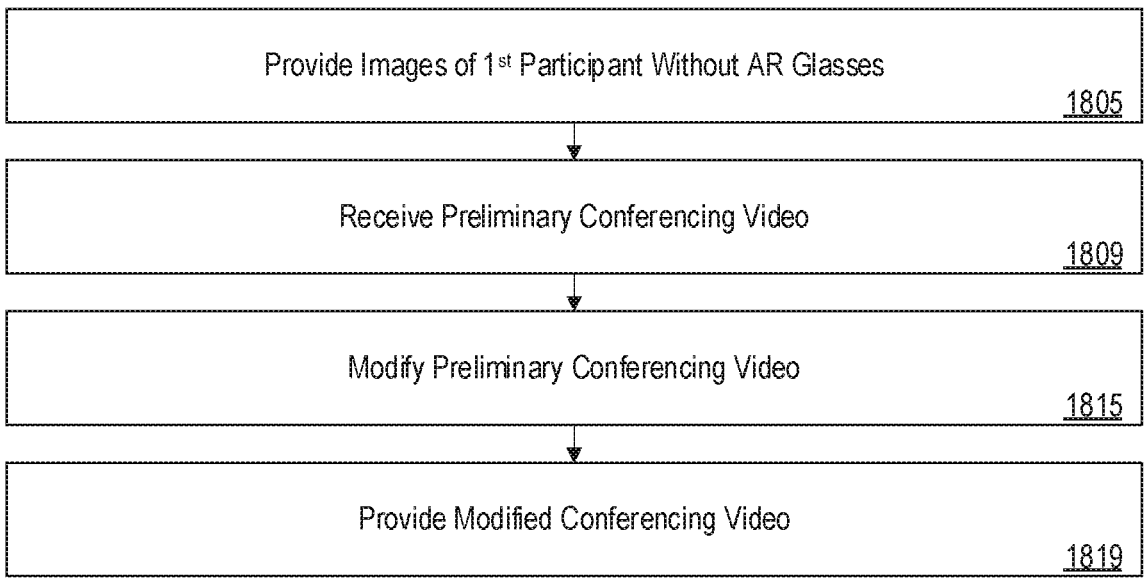

According to operations of FIG. 18, video conferencing node 600 provides video conferencing between a first participant P1 and a second participant P2. For the video conferencing, first participant P1 uses first conferencing camera C1 and first augmented reality AR glasses A1, and second participant P2 uses second conferencing camera C2 and second AR glasses A2.

At block 1805, processing circuitry 603 provides images of the first participant P1 without the first AR glasses A1 in memory 605. The images of the first participant P1 are provided with different orientations of the head of the first participant P1 without the first AR glasses A1. According to some embodiments, providing the images of the first participant P1 may include receiving (through network interface 607) initialization video of the first participant P1 without the first AR glasses A1, and providing the images based on the initialization video.

At block 1809, processing circuitry 603 receives (through network interface 607) preliminary conferencing video of the first participant P1 wearing the first AR glasses A1 from the first conferencing camera C1.

At block 1815, processing circuitry 603 modifies the preliminary conferencing video of the first participant P1 based on the images of the first participant P1 to provide modified conferencing video of the first participant P1 without the first AR glasses.

According to some embodiments, the images of the first participant P1 may be categorized according to orientation of a head of the first participant P1, and processing circuitry 603 may modify the preliminary conferencing video by modifying a frame of the preliminary conferencing video by matching the frame with one of the images based on orientation of the head in the frame and in the image and reconstructing portions of the frame including the first AR glasses A1 based on the image.

At block 1819, processing circuitry 603 provides (through network interface 607) the modified conferencing video of the first participant P1 without the first AR glasses A1 to be rendered by the second AR glasses A1 for the second participant P2.

According to some embodiments, processing circuitry 603 may provide the modified conferencing video at block 1819 by providing communication of the modified conferencing video (through network interface 607) to the second AR glasses A2 using a wireless mobile/cellular communication system (e.g., a 3rd Generation Partnership Project, 3GPP, communication system). According to some embodiments, the video conferencing node 600 may be included as an element of the wireless mobile/cellular communication system, or the video conferencing node may be provided as a video conferencing application server operating outside of the wireless mobile/cellular communication system.

Various operations from the flow chart of FIG. 18 may be optional with respect to some embodiments of video conferencing nodes and related methods.

Operations of a video conferencing node 600 (implemented using the structure of FIG. 13) will now be discussed with reference to the flow chart of FIG. 19 according to some embodiments of inventive concepts. For example, modules may be stored in memory 605 of FIG. 13, and these modules may provide instructions so that when the instructions of a module are executed by respective video conferencing node processing circuitry 603, processing circuitry 603 performs respective operations of the flow chart.

Figure 19:
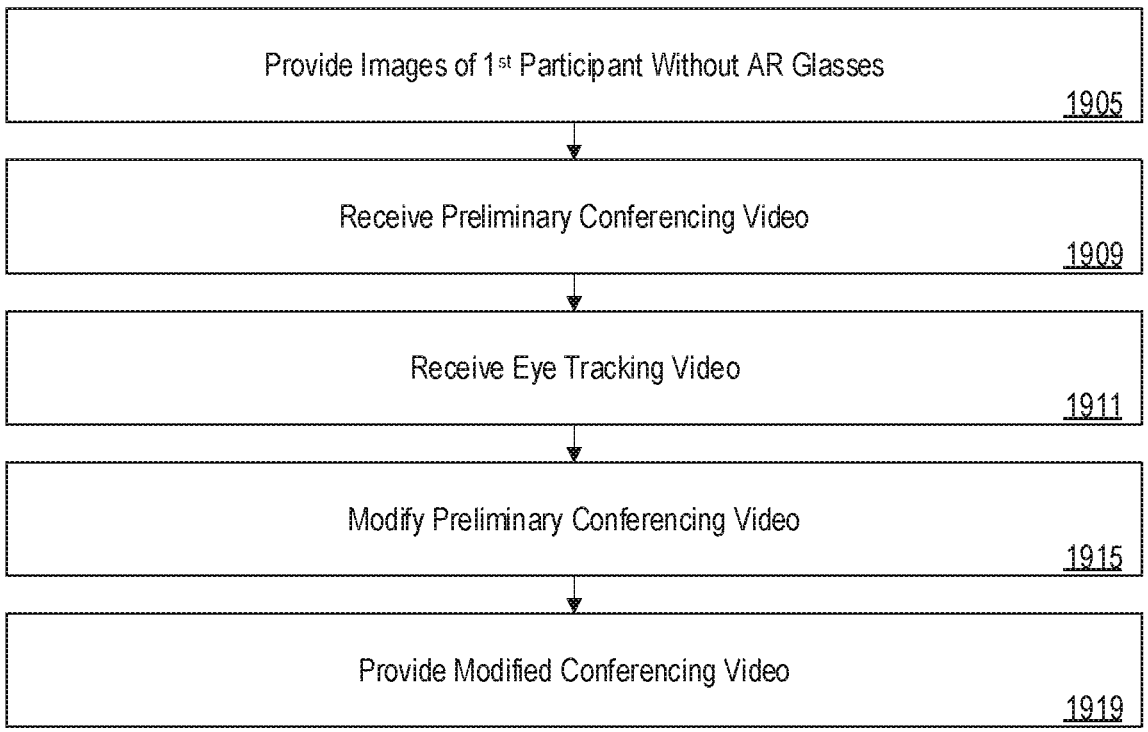

According to operations of FIG. 19, video conferencing node 600 provides video conferencing between a first participant P1 and a second participant P2. For the video conferencing, first participant P1 uses first conferencing camera C1 and first augmented reality AR glasses A1, and second participant P2 uses second conferencing camera C2 and second AR glasses A2.

At block 1905, processing circuitry 603 provides images of the first participant P1 without the first AR glasses A1 in memory 605. The images of the first participant P1 are provided with different orientations of the head of the first participant P1 without the first AR glasses A1. According to some embodiments, providing the images of the first participant P1 may include receiving (through network interface 607) initialization video of the first participant P1 without the first AR glasses A1, and providing the images based on the initialization video.

At block 1909, processing circuitry 603 receives (through network interface 607) preliminary conferencing video of the first participant P1 wearing the first AR glasses A1 from the first conferencing camera C1.

According to some embodiments, the first AR glasses A1 may include at least one rear facing eye tracking camera, and at block 1911, processing circuitry 603 may receive eye tracking video from the at least one rear facing eye tracking camera.

At block 1915, processing circuitry 603 modifies the preliminary conferencing video of the first participant P1 based on the images of the first participant P1 to provide modified conferencing video of the first participant P1 without the first AR glasses.

According to some embodiments, the images of the first participant P1 may be categorized according to orientation of a head of the first participant P1, and processing circuitry 603 may modify the preliminary conferencing video by modifying a frame of the preliminary conferencing video by matching the frame with one of the images based on orientation of the head in the frame and in the image and reconstructing portions of the frame including the first AR glasses A1 based on the image.

According to some embodiments, processing circuitry may modify the preliminary conferencing video by modifying the preliminary conferencing video based on the images of the first participant P1 and based on the eye tracking video to provide the modified conferencing video of the first participant P1 without the first AR glasses. For example, the preliminary conferencing video may be modified based on the eye tracking video to include at least one of eye movement and/or blinking from the eye tracking video in the modified conferencing video.

At block 1919, processing circuitry 603 provides (through network interface 607) the modified conferencing video of the first participant P1 without the first AR glasses A1 to be rendered by the second AR glasses A1 for the second participant P2.

According to some embodiments, processing circuitry 603 may provide the modified conferencing video at block 1919 by providing communication of the modified conferencing video (through network interface 607) to the second AR glasses A2 using a wireless mobile/cellular communication system (e.g., a 3rd Generation Partnership Project, 3GPP, communication system). According to some embodiments, the video conferencing node 600 may be included as an element of the wireless mobile/cellular communication system, or the video conferencing node may be provided as a video conferencing application server operating outside of the wireless mobile/cellular communication system.

Various operations from the flow chart of FIG. 19 may be optional with respect to some embodiments of video conferencing nodes and related methods. Regarding methods of example embodiment 29 (set forth below), for example, operations of block 1911 of FIG. 19 may be optional.

Example embodiments are discussed below.

Embodiment 1. A method providing video conferencing between a first participant (P1) using first augmented reality, AR, glasses (A1) with a first forward facing glasses camera and using a first conferencing camera (C1) and a second participant (P2) using second AR glasses (A2) with a second forward facing glasses camera and using a second conferencing camera (C2), the method comprising:
  receiving (1405, 1505) video of the second participant (P2) from the second conferencing camera (C2);
  receiving (1409, 1509) video from the first forward facing glasses camera of the first AR glasses (A1);
  adjusting (1415, 1515) the video of the second participant (P2) based on the video from the first forward facing glasses camera to provide adjusted video; and
  providing (1419, 1519) the adjusted video to be rendered by the first AR glasses (A1) for the first participant (P1).

Embodiment 2. The method of Embodiment 1, wherein adjusting the video of the second participant (P2) comprises transmitting a control parameter to the second conferencing camera (C2) to adjust the video provided by the second conferencing camera and thereby provide the adjusted video of the second participant (P2).

Embodiment 3. The method of Embodiment 2, wherein the control parameter comprises a least one of a control parameter to adjust a position of the second conferencing camera (C2), a control parameter to adjust a zoom of the second conferencing camera (C2), and/or a control parameter to adjust a depth of focus of the second conferencing camera (C2).

Embodiment 4. The method of any of Embodiments 1-3, wherein adjusting the video of the second participant (P2) comprises providing a geometric transformation of the video of the second participant (P2) received from the second conferencing camera (C2) to provide the adjusted video.

Embodiment 5. The method of any of Embodiments 1-4 further comprising:
  determining (1511) a position of the first conferencing camera (C1) using the video from the first forward facing glasses camera;
  wherein adjusting the video comprises adjusting the video of the second participant (P2) to provide the adjusted video based on the position of the first conferencing camera (C1) determined using the video from the first forward facing glasses camera.

Embodiment 6. The method of Embodiment 5, wherein determining the position of the first conferencing camera (C1) comprises determining a position of a marker (M) on the first conferencing camera (C1), and wherein adjusting the video comprises adjusting the video of the second participant (P2) to provide the adjusted video based on the position of the marker (M).

Embodiment 7. The method of any of Embodiments 1-6 further comprising:
  determining (1513) an eye position of the second participant (P2) in the video from the second camera (C2);
  wherein adjusting the video comprises adjusting the video of the second participant (P2) to provide the adjusted video based on the eye position of the second participant (P2) and the video from the first forward facing glasses camera.

Embodiment 8. The method of any of Embodiment 7, wherein adjusting the video comprises adjusting the video of the second participant (P2) to provide the adjusted video using the eye position of the second participant (P2) and using the video from the first forward facing glasses camera to provide a perception of eye contact.

Embodiment 9. The method of any of Embodiments 1-8, wherein adjusting the video to provide the adjusted video comprises adjusting the video of the second participant (P2) based on the video from the first forward facing glasses camera and scaling the video of the second participant (P2) to provide a target perceived distance (d) between the first participant (P1) and the second participant (P2) when rendered on the first AR glasses.

Embodiment 10. The method of Embodiment 9 further comprising:
  determining a distance (h) between the second participant (P2) and the second conferencing camera (C2);
  wherein scaling the video comprises scaling the video of the second participant (P2) to provide the target perceived distance between the first participant (P1) and the second participant (P2) based on the distance (h) between the second participant (P2) and the second conferencing camera (C2).

Embodiment 11. The method of any of Embodiments 9-10, wherein scaling the video comprises scaling the video of the second participant (P2) to provide the target perceived distance between the first participant (P1) and the second participant (P2) based on at least one of a resolution of the first AR glasses (A1) and/or a resolution of the second AR glasses (A2).

Embodiment 12. The method of any of Embodiments 9-11 further comprising:
  determining a size of the second participant (P2) based on the video of the second participant;
  wherein scaling the video comprises scaling the video of the second participant (P2) to provide the target perceived distance between the first participant (P1) and the second participant (P2) based on the size of the second participant (P2).

Embodiment 13. The method of any of Embodiments 9-12 further comprising:
  receiving video of the first participant (P1) from the first conferencing camera (C1);
  determining a size of the first participant (P1) based on the video of the first participant;
  wherein scaling the video comprises scaling the video of the second participant (P2) to provide the target perceived distance between the first participant (P1) and the second participant (P2) based on the size of the first participant (P1).

Embodiment 14. The method of any of Embodiments 1-13, wherein providing the adjusted video comprises transmitting the adjusted video to the first AR glasses (A1) for the first participant (P1).

Embodiment 15. A method providing video conferencing between a first participant (P1) using first augmented reality, AR, glasses (A1) with a first forward facing glasses camera and using a first conferencing camera (C1) and a second participant (P2) using second AR glasses (A2) with a second forward facing glasses camera and using a second conferencing camera (C2), the method comprising:
  receiving (1605, 1705) video of the second participant (P2) from the second conferencing camera (C2);
  adjusting (1619, 1719) the video of the second participant (P2) by scaling the video of the second participant (P2) to provide a target perceived distance (d) between the first participant (P1) and the second participant (P2) to provide adjusted video; and
  providing (1625, 1725) the adjusted video to be rendered by the first AR glasses (A1) for the first participant (P1).

Embodiment 16. The method of Embodiment 15 further comprising:
  determining (1707) a distance (h) between the second participant (P2) and the second conferencing camera (C2);
  wherein scaling the video comprises scaling the video of the second participant (P2) to provide the target perceived distance between the first participant (P1) and the second participant (P2) based on the distance (h) between the second participant (P2) and the second conferencing camera (C2).

Embodiment 17. The method of any of Embodiments 15-16, wherein scaling the video comprises scaling the video of the second participant (P2) to provide the target perceived distance between the first participant (P1) and the second participant (P2) based on at least one of a resolution of the first AR glasses (A1) and/or a resolution of the second AR glasses (A2).

Embodiment 18. The method of any of Embodiments 15-17 further comprising:
  determining (1709) a size of the second participant (P2) based on the video of the second participant;
  wherein scaling the video comprises scaling the video of the second participant (P2) to provide the target perceived distance between the first participant (P1) and the second participant (P2) based on the size of the second participant (P2).

Embodiment 19. The method of any of Embodiments 15-18 further comprising:
  receiving (1711) video of the first participant (P1) from the first conferencing camera (C1);
  determining (1713) a size of the first participant (P1) based on the video of the first participant;
  wherein scaling the video comprises scaling the video of the second participant (P2) to provide the target perceived distance between the first participant (P1) and the second participant (P2) based on the size of the first participant (P1).

Embodiment 20. The method of any of Embodiments 15-19 further comprising:
  receiving (1715) video from the first forward facing glasses camera of the first AR glasses (A1);
  wherein adjusting the video to provide the adjusted video comprises adjusting the video of the second participant (P2) based on the video from the first forward facing glasses camera to provide adjusted video and by scaling the video of the second participant (P2) to provide the target perceived distance (d) between the first participant (P1) and the second participant (P2).

Embodiment 21. The method of Embodiment 20, wherein adjusting the video of the second participant (P2) based on the video from the first forward facing glasses camera comprises transmitting a control parameter to the second conferencing camera (C2) to adjust the video provided by the second conferencing camera and thereby provide the adjusted video of the second participant (P2).

Embodiment 22. The method of Embodiment 21, wherein the control parameter comprises a least one of a control parameter to adjust a position of the second conferencing camera (C2), a control parameter to adjust a zoom of the second conferencing camera (C2), and/or a control parameter to adjust a depth of focus of the second conferencing camera (C2).

Embodiment 23. The method of any of Embodiments 20-22, wherein adjusting the video of the second participant (P2) based on the video from the first forward facing glasses camera comprises providing a geometric transformation of the video of the second participant (P2) received from the second conferencing camera (C2) to provide the adjusted video.

Embodiment 24. The method of any of Embodiments 20-23 further comprising:
  determining a position of the first conferencing camera (C1) using the video from the first forward facing glasses camera;
  wherein adjusting the video based on the video from the first forward facing glasses camera comprises adjusting the video of the second participant (P2) to provide the adjusted video based on the position of the first conferencing camera (C1) determined using the video from the first forward facing glasses camera.

Embodiment 25. The method of Embodiment 24, wherein determining the position of the first conferencing camera (C1) comprises determining a position of a marker (M) on the first conferencing camera (C1), and wherein adjusting the video comprises adjusting the video of the second participant (P2) to provide the adjusted video based on the position of the marker (M).

Embodiment 26. The method of any of Embodiments 20-25 further comprising:
  determining an eye position of the second participant (P2) in the video from the second camera (C2);
  wherein adjusting the video based on the video from the first forward facing glasses camera comprises adjusting the video of the second participant (P2) to provide the adjusted video based on the eye position of the second participant (P2) and the video from the first forward facing glasses camera.

Embodiment 27. The method of any of Embodiment 26, wherein adjusting the video based on the video from the first forward facing glasses camera comprises adjusting the video of the second participant (P2) to provide the adjusted video using the eye position of the second participant (P2) and using the video from the first forward facing glasses camera to provide a perception of eye contact.

Embodiment 28. The method of any of Embodiments 1-27, wherein providing the adjusted video comprises providing communication of the adjusted video to the first AR glasses (A1) using a wireless mobile/cellular communication system.

Embodiment 29. A method providing video conferencing between a first participant (P1) using first augmented reality, AR, glasses (A1) and using a first conferencing camera (C1) and a second participant (P2) using second AR glasses (A2) and using a second conferencing camera (C2), the method comprising:
  providing (1805, 1905) images of the first participant (P1) without the first AR glasses (A1) in memory, wherein the images of the first participant (P1) are provided with different orientations of the head of the first participant (P1) without the first AR glasses (A1);
  receiving (1809, 1909) preliminary conferencing video of the first participant (P1) wearing the first AR glasses (A1) from the first conferencing camera (C1);
  modifying (1815, 1915) the preliminary conferencing video of the first participant (P1) based on the images of the first participant (P1) to provide modified conferencing video of the first participant (P1) without the first AR glasses;
  providing (1819, 1919) the modified conferencing video of the first participant (P1) without the first AR glasses (A1) to be rendered by the second AR glasses (A1) for the second participant (P2).

Embodiment 30. The method of Embodiment 29, wherein providing the images of the first participant (P1) comprises receiving initialization video of the first participant (P1) without the first AR glasses (A1), and providing the images based on the initialization video.

Embodiment 31. The method of any of Embodiments 29-30, wherein the images of the first participant (P1) are categorized according to orientation of a head of the first participant (P1), and wherein modifying the preliminary conferencing video comprises modifying a frame of the preliminary conferencing video by matching the frame with one of the images based on orientation of the head in the frame and in the image, and reconstructing portions of the frame including the first AR glasses (A1) based on the image.

Embodiment 32. The method of any of Embodiments 29-31, wherein the first AR glasses (A1) include at least one rear facing eye tracking camera, the method further comprising:
  receiving (1911) eye tracking video from the at least one rear facing eye tracking camera;
  wherein modifying the preliminary conferencing video comprises modifying the preliminary conferencing video based on the images of the first participant (P1) and based on the eye tracking video to provide the modified conferencing video of the first participant (P1) without the first AR glasses.

Embodiment 33. The method of Embodiment 32, wherein modifying the preliminary conferencing video comprises modifying the preliminary conferencing video based on the eye tracking video to include at least one of eye movement and/or blinking from the eye tracking video in the modified conferencing video.

Embodiment 34. The method of any of Embodiments 29-33, wherein providing the modified conferencing video comprises providing communication of the modified conferencing video to the second AR glasses (A2) using a wireless mobile/cellular communication system.

Embodiment 35. A video conferencing node (600) comprising:
  processing circuitry (603); and
  memory (605) coupled with the processing circuitry, wherein the memory includes instructions that when executed by the processing circuitry causes the video conferencing node (600) to perform operations according to any of Embodiments 1-34.

Embodiment 36. A video conferencing node (600) adapted to perform according to any of Embodiments 1-34.

Embodiment 37. A computer program comprising program code to be executed by processing circuitry (603) of a video conferencing node (600), whereby execution of the program code causes the video conferencing node (600) to perform operations according to any of embodiments 1-34.

Embodiment 38. A computer program product comprising a non-transitory storage medium including program code to be executed by processing circuitry (603) of a video conferencing node (600), whereby execution of the program code causes the video conferencing node (600) to perform operations according to any of embodiments 1-34.

Explanations are provided below for various abbreviations/acronyms used in the present disclosure.

Abbreviation Explanation

AR Augmented reality
IMS IP Multimedia system

VR Virtual reality

XR Extended reality

References are identified below.

Reference [1] CN 108076307A, Video conferencing system based on AR and the video-meeting method based on AR", publication date May 2018

Reference [2] U.S. Pat. No. 9,524,588 B2, Enhanced communication between remote participants using augmented and virtual reality, publication date July 2015

Reference [3] U.S. Pat. No. 9,712,751 B2, CAMERA FIELD OF VIEW EFFECTS BASED ON DEVICE ORIENTATION AND SCENE CONTENT, publication date July 2016

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 20:
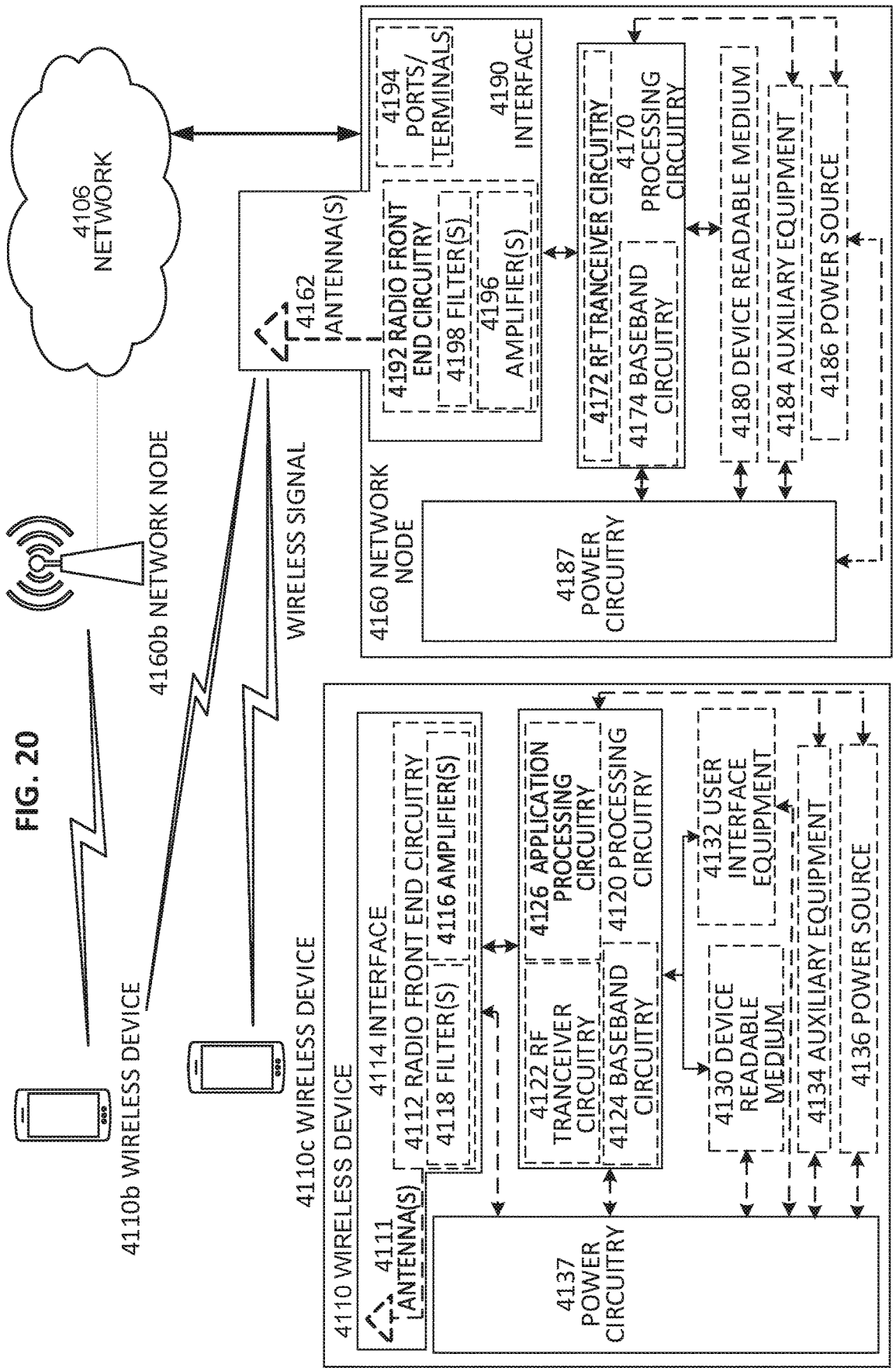
FIG. 20 is a block diagram of a wireless network in accordance with some embodiments.

FIG. 20 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 20 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. As another example, an AR glass tethered to a mobile phone, represents a WD that communicates with a network node for communication services. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 21:
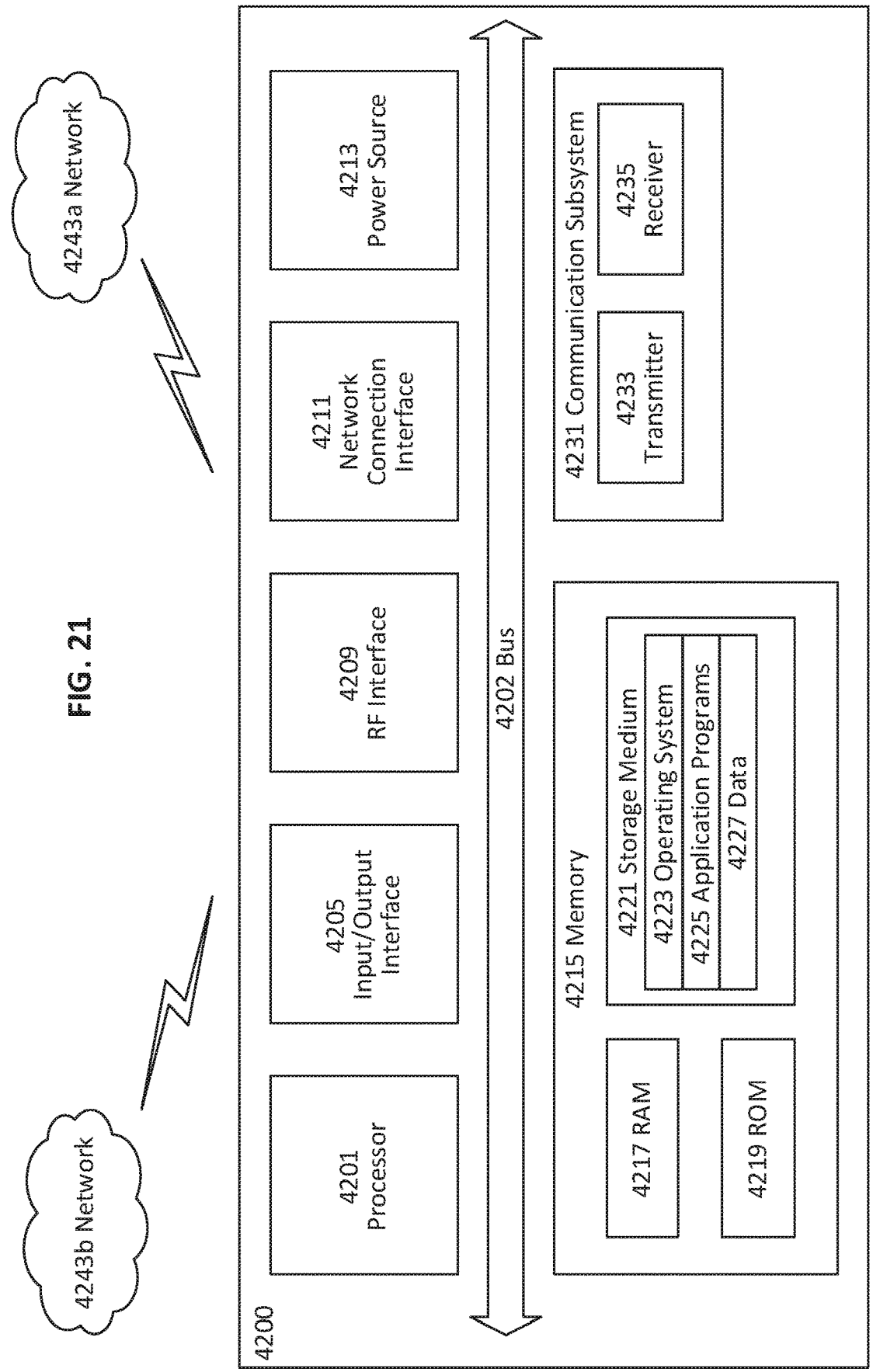
FIG. 21 is a block diagram of a user equipment in accordance with some embodiments

FIG. 21 illustrates a user Equipment in accordance with some embodiments.

FIG. 21 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 21, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 21, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 22:
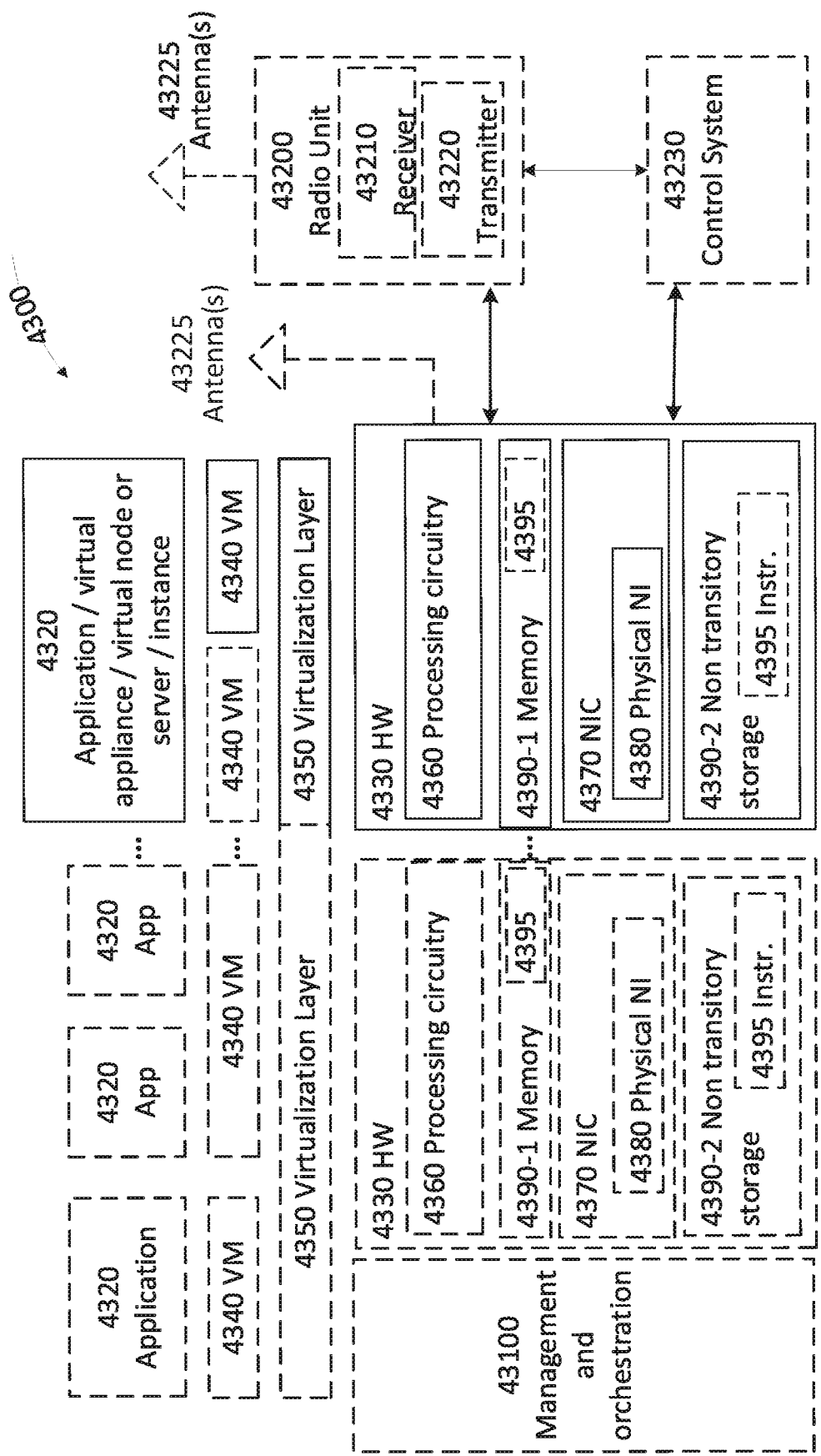
FIG. 22 is a block diagram of a virtualization environment in accordance with some embodiments.

FIG. 22 illustrates a virtualization environment in accordance with some embodiments.

FIG. 22 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 22, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 22.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 23:
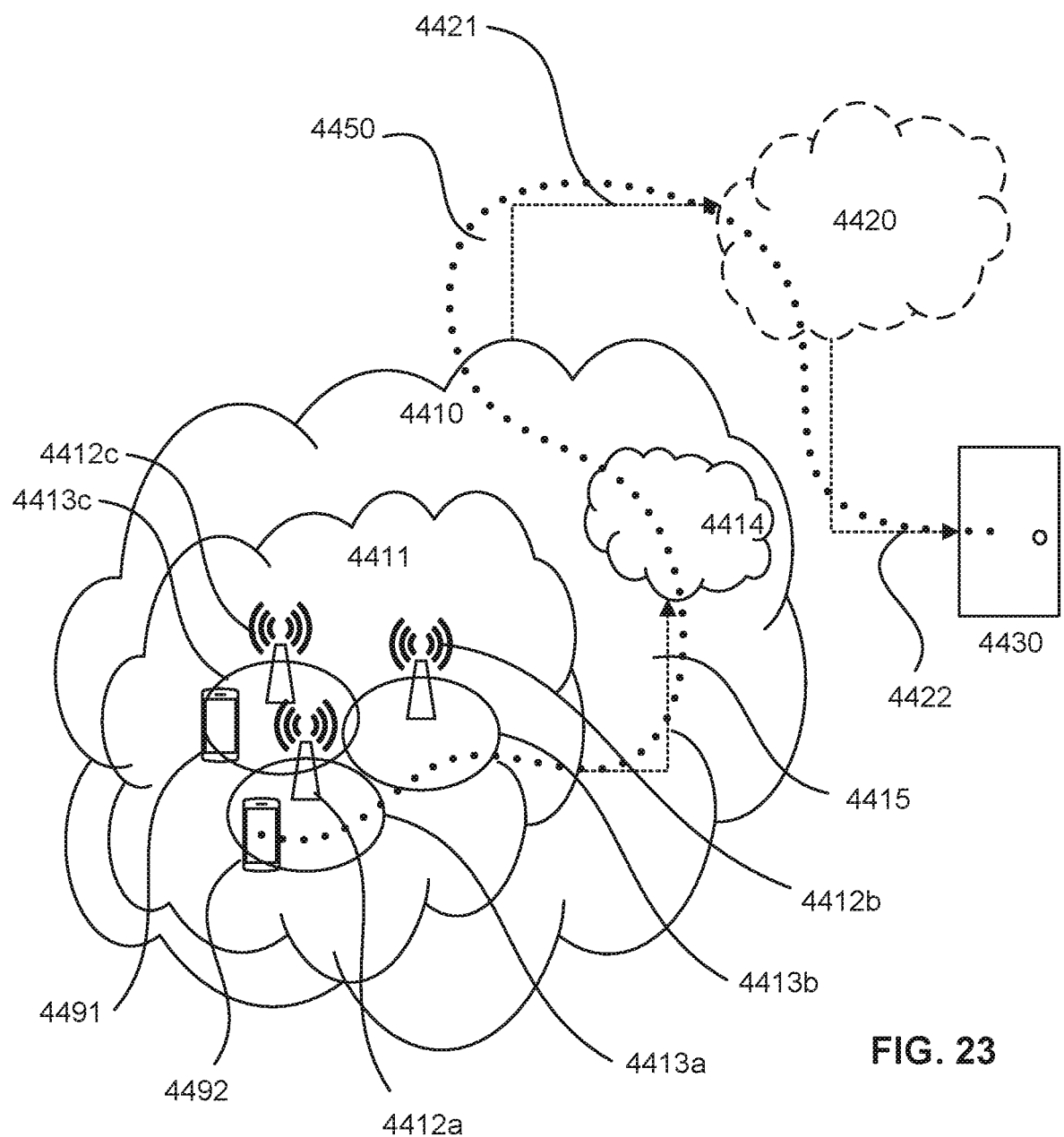
FIG. 23 is a block diagram of a telecommunication network connected via an intermediate network to a host computer in accordance with some embodiments.

FIG. 23 illustrates a telecommunication network connected via an intermediate network to a host computer in accordance with some embodiments.

With reference to FIG. 18, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 23 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 24:
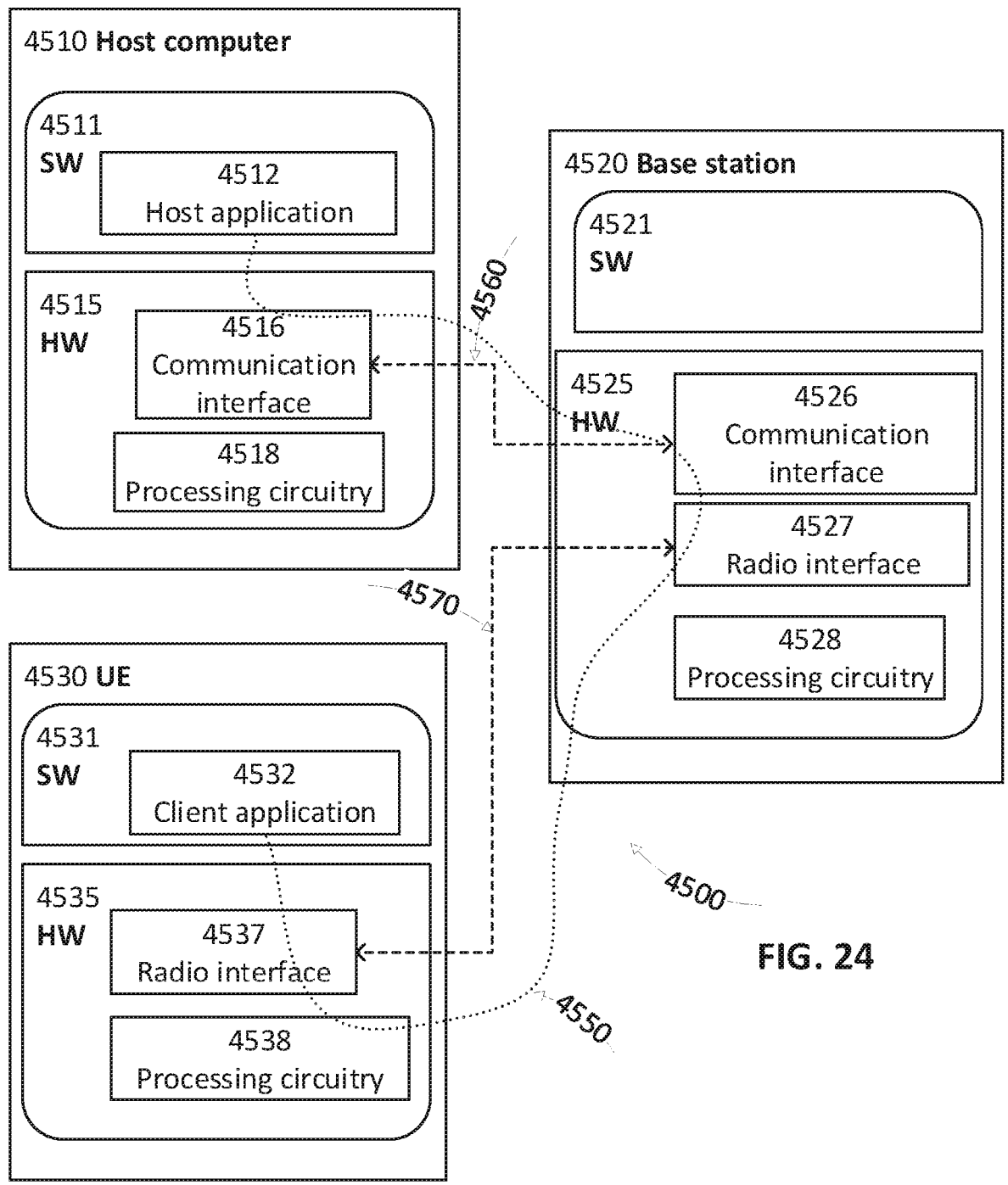
FIG. 24 is a block diagram of a host computer communicating via a base station with a user equipment over a partially wireless connection in accordance with some embodiments.

FIG. 24 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 24. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 24) served by base station 4520. Communication interface 4526 may be configured to facilitate connection 4560 to host computer 4510. Connection 4560 may be direct or it may pass through a core network (not shown in FIG. 24) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 24 may be similar or identical to host computer 4430, one of base stations 4412a, 4412b, 4412c and one of UEs 4491, 4492 of FIG. 23, respectively. This is to say, the inner workings of these entities may be as shown in FIG. 24 and independently, the surrounding network topology may be that of FIG. 23.

In FIG. 24, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 25:
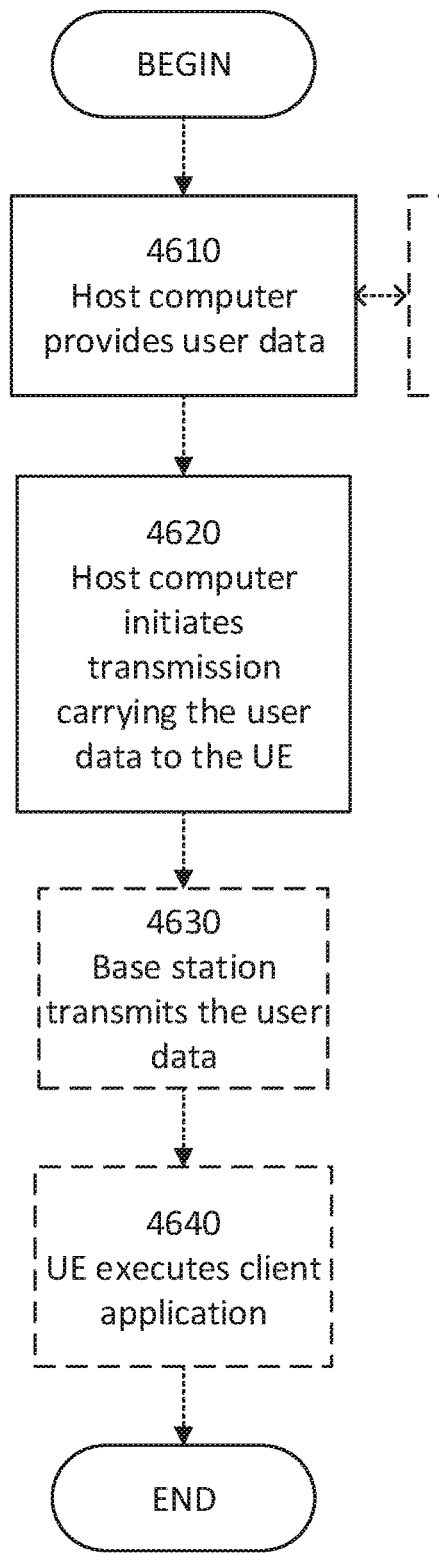
FIG. 25 is a block diagram of methods implemented in a communication system including a host computer, a base station and a user equipment in accordance with some embodiments.

FIG. 25 illustrates methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 23-24. For simplicity of the present disclosure, only drawing references to FIG. 25 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 26:
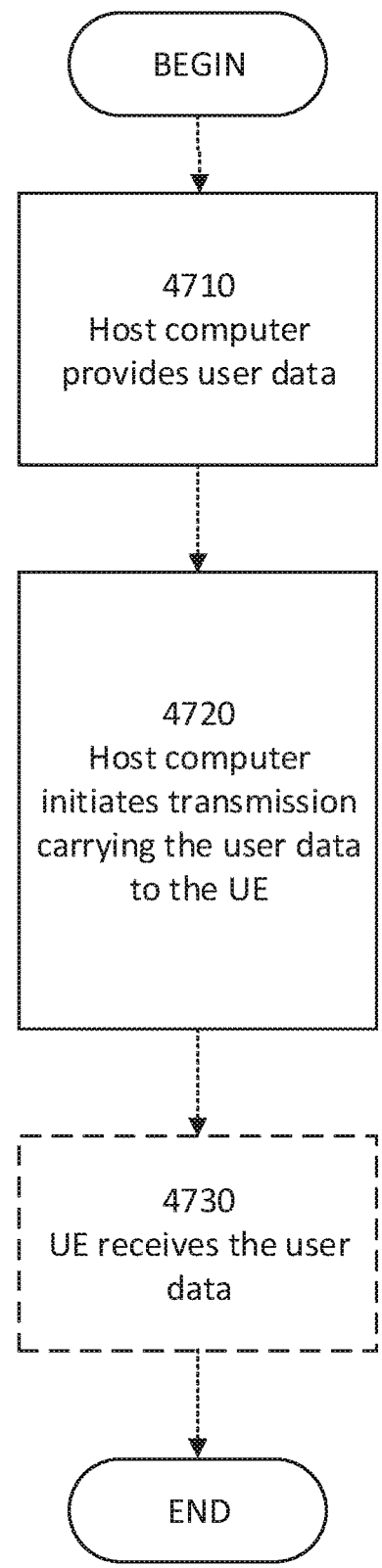
FIG. 26 is a block diagram of methods implemented in a communication system including a host computer, a base station and a user equipment in accordance with some embodiments.

FIG. 26 illustrates methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 23-24. For simplicity of the present disclosure, only drawing references to FIG. 26 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 27 illustrates methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 23-24. For simplicity of the present disclosure, only drawing references to FIG. 27 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 28 illustrates methods implemented in a communication system including a host computer, a base station and a user equipment in accordance with some embodiments.

FIG. 28 is a flowchart illustrating a method implemented in a communication system, in accordance with one embodiment. The communication system includes a host computer, a base station and a UE which may be those described with reference to FIGS. 23-24. For simplicity of the present disclosure, only drawing references to FIG. 28 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

- 1×RTT CDMA2000 1× Radio Transmission Technology
- 3GPP 3rd Generation Partnership Project
- 5G 5th Generation
- ABS Almost Blank Subframe
- ARQ Automatic Repeat Request
- AWGN Additive White Gaussian Noise
- BCCH Broadcast Control Channel
- BCH Broadcast Channel
- CA Carrier Aggregation
- CC Carrier Component
- CCCH SDU Common Control Channel SDU
- CDMA Code Division Multiplexing Access
- CGI Cell Global Identifier
- CIR Channel Impulse Response
- CP Cyclic Prefix
- CPICH Common Pilot Channel
- CPICH Ec/No CPICH Received energy per chip divided by the power density in the band
- CQI Channel Quality information
- C-RNTI Cell RNTI
- CSI Channel State Information
- DCCH Dedicated Control Channel
- DL Downlink
- DM Demodulation
- DMRS Demodulation Reference Signal
- DRX Discontinuous Reception
- DTX Discontinuous Transmission
- DTCH Dedicated Traffic Channel
- DUT Device Under Test
- E-CID Enhanced Cell-ID (positioning method)
- E-SMLC Evolved-Serving Mobile Location Centre
- ECGI Evolved CGI
- eNB E-UTRAN NodeB
- ePDCCH enhanced Physical Downlink Control Channel
- E-SMLC evolved Serving Mobile Location Center
- E-UTRA Evolved UTRA
- E-UTRAN Evolved UTRAN
- FDD Frequency Division Duplex
- FFS For Further Study
- GERAN GSM EDGE Radio Access Network
- gNB Base station in NR
- GNSS Global Navigation Satellite System
- GSM Global System for Mobile communication
- HARQ Hybrid Automatic Repeat Request
- HO Handover
- HSPA High Speed Packet Access
- HRPD High Rate Packet Data
- LOS Line of Sight
- LPP LTE Positioning Protocol
- LTE Long-Term Evolution
- MAC Medium Access Control
- MBMS Multimedia Broadcast Multicast Services
- MBSFN Multimedia Broadcast multicast service Single Frequency Network
- MBSFN ABS MBSFN Almost Blank Subframe
- MDT Minimization of Drive Tests
- MIB Master Information Block
- MME Mobility Management Entity
- MSC Mobile Switching Center
- NPDCCH Narrowband Physical Downlink Control Channel
- NR New Radio
- OCNG OFDMA Channel Noise Generator
- OFDM Orthogonal Frequency Division Multiplexing
- OFDMA Orthogonal Frequency Division Multiple Access
- OSS Operations Support System
- OTDOA Observed Time Difference of Arrival
- O&M Operation and Maintenance
- PBCH Physical Broadcast Channel
- P-CCPCH Primary Common Control Physical Channel
- PCell Primary Cell
- PCFICH Physical Control Format Indicator Channel
- PDCCH Physical Downlink Control Channel
- PDP Profile Delay Profile
- PDSCH Physical Downlink Shared Channel
- PGW Packet Gateway
- PHICH Physical Hybrid-ARQ Indicator Channel
- PLMN Public Land Mobile Network
- PMI Precoder Matrix Indicator
- PRACH Physical Random Access Channel
- PRS Positioning Reference Signal
- PSS Primary Synchronization Signal
- PUCCH Physical Uplink Control Channel
- PUSCH Physical Uplink Shared Channel
- RACH Random Access Channel
- QAM Quadrature Amplitude Modulation
- RAN Radio Access Network
- RAT Radio Access Technology
- RLM Radio Link Management
- RNC Radio Network Controller
- RNTI Radio Network Temporary Identifier
- RRC Radio Resource Control
- RRM Radio Resource Management
- RS Reference Signal
- RSCP Received Signal Code Power
- RSRP Reference Symbol Received Power OR Reference Signal Received Power
- RSRQ Reference Signal Received Quality OR Reference Symbol Received Quality
- RSSI Received Signal Strength Indicator
- RSTD Reference Signal Time Difference
- SCH Synchronization Channel
- SCell Secondary Cell
- SDU Service Data Unit SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method of providing video conferencing between a first participant using first augmented reality (AR) glasses with a first forward facing glasses camera and using a first conferencing camera and a second participant using second AR glasses with a second forward facing glasses camera and using a second conferencing camera, the method comprising:
    receiving video of the second participant from the second conferencing camera;
    receiving video from the first forward facing glasses camera of the first AR glasses;
    collecting resolution data and participant eye position data from each of the first AR glasses and second AR glasses;
    adjusting the video of the second participant based on the video from the first forward facing glasses camera and the participant eye position data of the second participant to provide adjusted video, wherein adjusting the video includes scaling the video of the second participant based on i) a distance between the second participant and the second conferencing camera, and ii) the resolution of at least one of the first AR glasses or the second AR glasses; and
    providing the adjusted video to be rendered by the first AR glasses for the first participant, wherein the adjusted video maintains a perception of eye contact between the first participant and the second participant.

2. The method of claim 1, wherein adjusting the video of the second participant comprises transmitting the control parameter to the second conferencing camera to adjust the video provided by the second conferencing camera and thereby provide the adjusted video of the second participant.

3. The method of claim 2, wherein the control parameter comprises a least one of a control parameter to adjust a position of the second conferencing camera, a control parameter to adjust a zoom of the second conferencing camera, and/or a control parameter to adjust a depth of focus of the second conferencing camera.

4. The method of claim 1, wherein adjusting the video of the second participant comprises providing a geometric transformation of the video of the second participant received from the second conferencing camera to provide the adjusted video.

5. The method of claim 1 further comprising:
    determining a position of the first conferencing camera using the video from the first forward facing glasses camera;
    wherein adjusting the video comprises adjusting the video of the second participant to provide the adjusted video based on the position of the first conferencing camera determined using the video from the first forward facing glasses camera.

6. The method of claim 5, wherein determining the position of the first conferencing camera comprises determining a position of a marker on the first conferencing camera, and wherein adjusting the video comprises adjusting the video of the second participant to provide the adjusted video based on the position of the marker.

7. The method of claim 1 further comprising:
    determining an eye position of the second participant in the video from the second camera,
    wherein adjusting the video comprises adjusting the video of the second participant to provide the adjusted video based on the eye position of the second participant and the video from the first forward facing glasses camera.

8. The method of claim 1, wherein providing the adjusted video comprises transmitting the adjusted video to the first AR glasses for the first participant.

9. The method of claim 1, wherein providing the adjusted video comprises providing communication of the adjusted video to the first AR glasses using a wireless mobile/cellular communication system.

10. A method providing video conferencing between a first participant using first augmented reality (AR) glasses with a first forward facing glasses camera and using a first conferencing camera and a second participant using second AR glasses with a second forward facing glasses camera and using a second conferencing camera, the method comprising:
    receiving video of the second participant from the second conferencing camera;
    determining a distance (h) between the second participant and the second conferencing camera;
    adjusting the video of the second participant by scaling the video of the second participant to provide a target perceived distance (d) between the first participant and the second participant to provide adjusted video, wherein scaling the video of the second participant to provide the target perceived distance (d) is based on the distance (h) between the second participant and the second conferencing camera; and
    providing the adjusted video to be rendered by the first AR glasses for the first participant, wherein the adjusted video maintains a perception of eye contact between the first participant and the second participant.

11. The method of claim 10, wherein scaling the video comprises scaling the video of the second participant to provide the target perceived distance between the first participant and the second participant based on at least one of a resolution of the first AR glasses and/or a resolution of the second AR glasses.

12. The method of claim 10 further comprising:
    determining a size of the second participant based on the video of the second participant,
    wherein scaling the video comprises scaling the video of the second participant to provide the target perceived distance between the first participant and the second participant based on the size of the second participant.

13. The method of claim 10 further comprising:
    receiving video of the first participant from the first conferencing camera; and
    determining a size of the first participant based on the video of the first participant,
    wherein scaling the video comprises scaling the video of the second participant to provide the target perceived distance between the first participant and the second participant based on the size of the first participant.

14. The method of claim 10 further comprising:
receiving video from the first forward facing glasses camera of the first AR glasses,
wherein adjusting the video to provide the adjusted video comprises adjusting the video of the second participant based on the video from the first forward facing glasses camera to provide adjusted video and by scaling the video of the second participant to provide the target perceived distance (d) between the first participant and the second participant.

15. The method of claim 10, wherein providing the adjusted video comprises providing communication of the adjusted video to the first AR glasses using a wireless mobile/cellular communication system.

16. A video conferencing node comprising:
processing circuitry; and
memory coupled with the processing circuitry, wherein the memory includes instructions that when executed by the processing circuitry causes the video conferencing node to perform operations comprising:
receive video of a second participant from a second conferencing camera, wherein the second participant is utilizing a second augmented reality (AR) glasses with a second forward facing glasses camera and using a second conferencing camera to conduct video conferencing with a first participant utilizing a first AR glasses with a first forward facing glasses camera and using a first conferencing camera;
receive video from the first forward facing glasses camera of the first AR glasses;
collect resolution data and participant eye position data from each of the first AR glasses and the second AR glasses;
adjust the video of the second participant based on the video from the first forward facing glasses camera and the participant eye position data associated with the second participant to provide adjusted video, wherein adjustment of the video of the second participant includes scaling the video of the second participant based on i) a distance between the second participant and the second conferencing camera, and ii) the resolution of at least one of the first AR glasses or the second AR glasses; and
provide the adjusted video to be rendered by the first AR glasses for the first participant, wherein the adjusted video maintains a perception of eye contact between the first participant and the second participant.

17. A video conferencing node comprising:
processing circuitry; and
memory coupled with the processing circuitry, wherein the memory includes instructions that when executed by the processing circuitry causes the video conferencing node to perform operations comprising:
receive video of the second participant from the second conferencing camera;
determine a distance (h) between the second participant and the second conferencing camera;
adjust the video of the second participant by scaling the video of the second participant to provide a target perceived distance (d) between the first participant and the second participant to provide adjusted video, wherein scaling the video of the second participant to provide the target perceived distance (d) is based on the distance (h) between the second participant and the second conferencing camera; and
provide the adjusted video to be rendered by the first AR glasses for the first participant, wherein the adjusted video maintains a perception of eye contact between the first participant and the second participant.

* * * * *